US011655650B2

(12) United States Patent
Wood et al.

(10) Patent No.: US 11,655,650 B2
(45) Date of Patent: May 23, 2023

(54) PORTABLE AND MODULAR FIELD BLIND SYSTEM

(71) Applicant: Icon Outdoors, LLC, Olive Branch, MS (US)

(72) Inventors: Tate Wood, Olive Branch, MS (US); Bobby L. Windham, Jr., Olive Branch, MS (US); James L. Spence, Olive Branch, MS (US)

(73) Assignee: Icon Outdoors, LLC, Olive Branch, MS (US)

( * ) Notice: Subject to any disclaimer, the term of this patent is extended or adjusted under 35 U.S.C. 154(b) by 322 days.

(21) Appl. No.: 17/112,952

(22) Filed: Dec. 4, 2020

(65) Prior Publication Data

US 2022/0162877 A1    May 26, 2022

Related U.S. Application Data

(60) Provisional application No. 62/942,226, filed on Dec. 2, 2019.

(51) Int. Cl.
| | | |
|---|---|---|
| *E04H 15/00* | (2006.01) | |
| *A01M 31/02* | (2006.01) | |
| *E04H 15/54* | (2006.01) | |
| *E04H 15/48* | (2006.01) | |

(52) U.S. Cl.
CPC ......... *E04H 15/001* (2013.01); *A01M 31/025* (2013.01); *E04H 15/48* (2013.01); *E04H 15/54* (2013.01)

(58) Field of Classification Search
CPC .......................... E04H 15/001; A01M 31/025
See application file for complete search history.

(56) References Cited

U.S. PATENT DOCUMENTS

| | | | | |
|---|---|---|---|---|
| 3,018,857 | A * | 1/1962 | Parham | E04H 15/001 |
| | | | | 52/36.2 |
| 3,323,530 | A | 6/1967 | Smith | |
| 4,716,919 | A * | 1/1988 | Griffin | E04H 15/48 |
| | | | | 135/901 |
| 4,798,019 | A * | 1/1989 | Sury | A01M 31/025 |
| | | | | 135/901 |
| 5,458,079 | A * | 10/1995 | Matthews | B63B 17/02 |
| | | | | 114/361 |
| 5,906,217 | A * | 5/1999 | Hill | E04H 15/48 |
| | | | | 135/132 |

(Continued)

*Primary Examiner* — David R Dunn
*Assistant Examiner* — Danielle Jackson
(74) *Attorney, Agent, or Firm* — Warren D. Schickli; Stites & Harbison PLLC

(57) ABSTRACT

Portable hunting blind is adapted for concealing and facilitating exit of hunter. Portable hunting blind including blind side panel and blind top panel. Blind side panel includes front panel, rear panel, and end panels removably mounted to front panel. Each of the front panel, rear panel and end panels includes legs. Blind top panel includes front top panel and rear top panel pivotally mounted to center brackets mounted to end panels. Front top panel comprising blind top is thrown back over rear top panel to impede rear exit for hunter, and to allow hunter to demount front panel and open front panel outward as a gate to exit portable hunting blind. Rear top panel is operated similarly to allow hunter to exit from back of portable hunting blind.

20 Claims, 25 Drawing Sheets

(56) References Cited

U.S. PATENT DOCUMENTS

| | | | | |
|---|---|---|---|---|
| 6,016,823 | A * | 1/2000 | Hill | E04H 15/48 |
| | | | | 135/132 |
| 7,063,035 | B2 * | 6/2006 | Belcher | B63B 17/02 |
| | | | | 114/361 |
| 7,549,434 | B2 * | 6/2009 | Bean | E04H 15/001 |
| | | | | 135/901 |
| 8,936,036 | B2 * | 1/2015 | Parsons | E04H 15/001 |
| | | | | 135/117 |
| 9,133,644 | B1 * | 9/2015 | Liu | A01M 31/025 |
| 9,279,268 | B2 * | 3/2016 | Liu | B63B 17/02 |
| 9,556,638 | B2 | 1/2017 | Clendaniel et al. | |
| 10,584,511 | B1 * | 3/2020 | Slaughter | E04H 15/001 |
| 11,470,840 | B2 * | 10/2022 | Bell | A01M 31/025 |
| 2021/0161123 | A1 * | 6/2021 | Wood | E04H 15/001 |
| 2021/0298287 | A1 * | 9/2021 | Wood | B63B 17/02 |
| 2022/0361480 | A1 * | 11/2022 | Wood | E04H 15/34 |

* cited by examiner

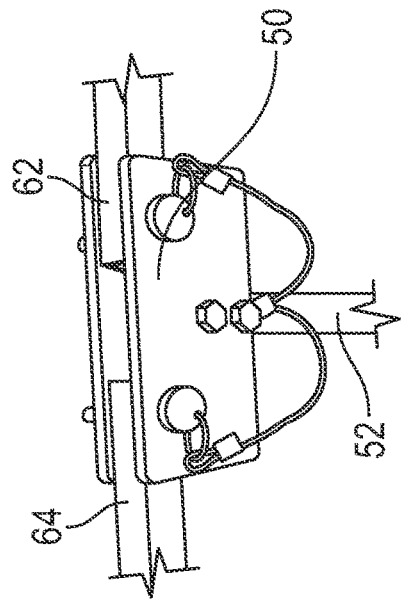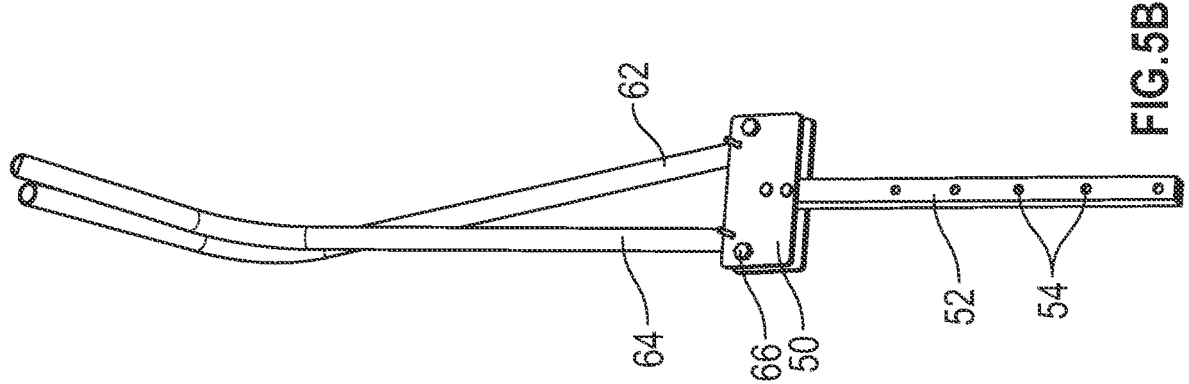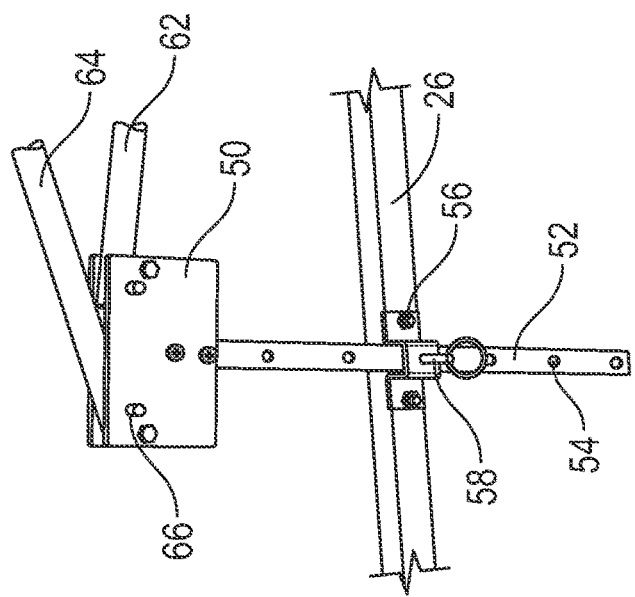

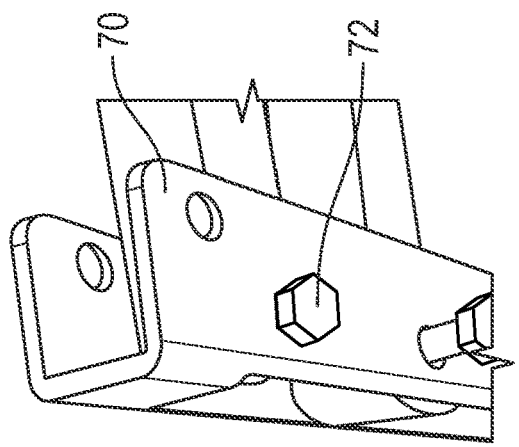
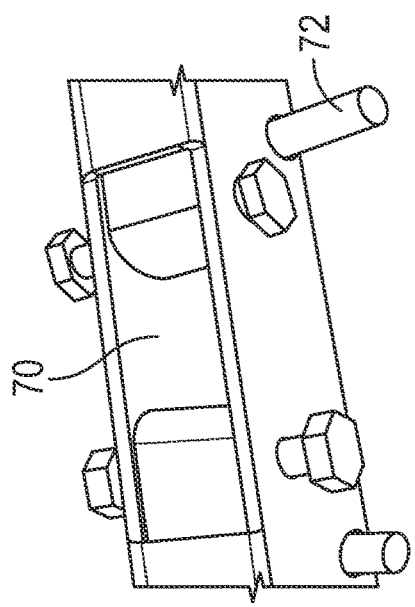
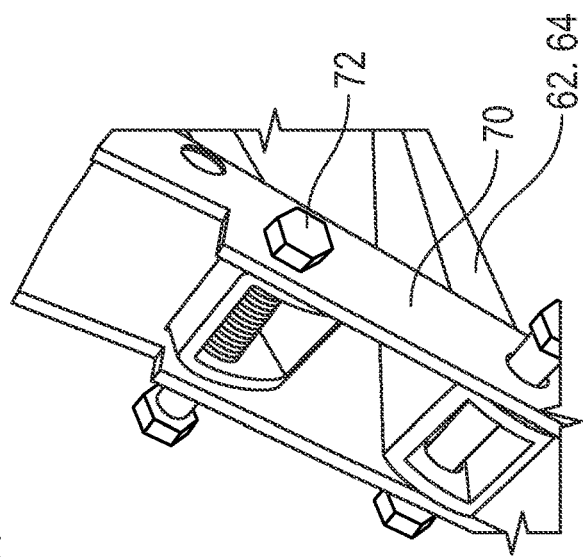
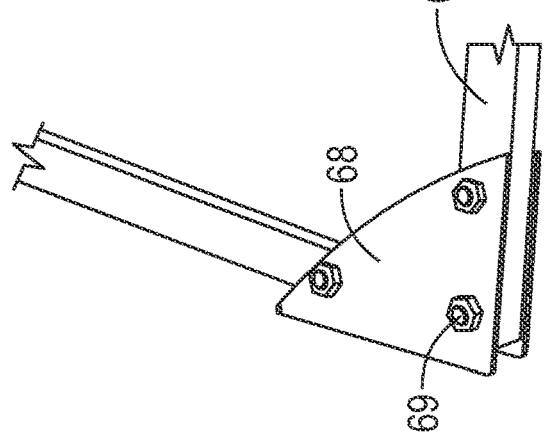

PORTABLE AND MODULAR FIELD BLIND SYSTEM

FIELD OF THE DISCLOSURE

The present disclosure relates to temporary shelters and, more particularly, to a portable hunting blind requiring no additional equipment, tools, or people to easily assemble and providing camouflage to enable a user to appear as part of the environment during hunting or photographing wildlife.

BACKGROUND OF THE DISCLOSURE

A hunting blind is a cover device for hunters or gamekeepers, designed to reduce the chance of detection. There are different types of blinds for different situations, such as deer blinds and duck blinds. Some are exceedingly simple, while others are complex. The legality of various kinds of blinds may vary according to season, state and location.

Duck blinds can be as simple as a hunter walking two or three miles out into a grain field, stopping at a dike, a raised area, two feet or so high, 10 or 12 feet wide and usually a half mile or so long on a side. Duck blinds also can be quite elaborate, and their purpose may often extend beyond concealment to include protection from the elements, particularly from rain and cold. In some areas, the blinds can approach small cabins in their size and amenities. Also, for hunting waterfowl in fields, hunters may use a layout blind. A layout blind is a low-profile blind that a person can lay down in to hide from waterfowl.

Field blinds have been made for many years. In the last decade, portable field blinds have become popular. Most of these require assembly involving loose parts. Handling loose parts in the dark can be frustrating, particularly when the hunter would prefer to be hunting and shooting. The challenge is to make a blind that is large and roomy enough for three to five hunters. This requires an area of approximately 6-10' end-to-end and about 3-4' front to back. However, most blinds are 4' at the base and narrow to around 3' at the top opening.

Commercially available blinds require the hunters to duck their head and keep their face down. When there are more than three to five hunters, controlling the "movement" becomes difficult. Also, waterfowl flare or spook easily, especially when the hunters turn and look up in the sky. These movements can totally defeat the purpose of the hunting blind. Some hunting blinds seek to solve this problem by providing a blind top. Typically, a top operates one of two ways, it either falls forward or hits the frame or it throws backward. The problem with the tops that fall forward is the requirement for netting to look through. Sometimes looking through netting is inhibiting, depending on the type of netting being used. When the hunter throws the top forward to cause it to collapse on the front of the blind, he frequently loses sight of the game.

Hunters also often use tall cane or sagebrush that can be 3 to 5' tall to camouflage a hunting blind. Frequently this brush may be several feet higher than the frame of the blind. As a result, this tall brush prevents a top from falling to the outside of a blind. The tops can be made to fall forward to the outside of the walls. Because of this limitation, there is a need for the blind top to fall forward or backwards inside the confines or on top of the walls. This can prevent the top from contacting or damaging the brush outside the blind.

It is important that the top height be adjustable. Some hunters will want no gap to see out of, they are more concerned about being hidden, while some will want to be able to see freely out of the front, rear and sides of the blinds.

One example of a hunting blind that seeks to serve hunters is disclosed in a U.S. Pat. No. 9,556,638, entitled "Portable Hunting Blind" (the "'638 Patent"). The '638 Patent discloses a portable hunting blind having a fabric panel supported and retained by a blind frame, which together provide a concealed space. The blind frame includes two spaced apart horizontal members and a supporting framework for holding the two spaced apart horizontal members parallel to each other and above a supporting surface by a predetermined height, wherein all components of the blind frame are assembled by slidably mating. The fabric panel is dimensioned and adapted to be supported by an exterior of the two spaced apart horizontal members and the supporting framework so as to bound the concealed space. The fabric panel provides a plurality of strap fasteners for removably securing to the components of the blind frame by simply wrapping around them, thereby making the portable hunting blind light weight and to easily assemble without additional parts or tools.

Another example is disclosed in a U.S. Pat. No. 3,323,530, entitled "Sportsman's Blind" (the "'530 Patent"). The '530 Patent discloses a portable shelter structure comprising, a frame having upright corner posts, cross rails extending between adjacent posts at the tops thereof, and means to interlock the posts and the cross rails in fixed relationship when assembled. A flexible covering having an elongated portion extends laterally around the framework to define sides and another portion extending away from the elongated portion to define a top, the top terminating in a free edge having a hem, a stiffener rod in the hem. The covering also has securing means on the ends of the elongated portion for fastening the ends together and for maintaining the flexible covering on the framework. A releasable hook means is provided on one of the cross rails to engage the stiffener rod and hold the top portion extended across the framework. Resilient means are provided between the stiffener rod and the cross rail opposite the one cross rail to open the top when the hook means is tripped.

Each of the above-referenced portable blinds has limitations. Therefore, there is a need for improvement in the structure and functions, use and manufacture of blinds for hunting and other purposes. The present disclosure makes possible a number of the needed solutions and makes a material and substantial improvement to the current state of the art in portable field blinds for hunting and related purposes.

BRIEF SUMMARY OF THE DISCLOSURE

The present disclosure includes a portable hunting blind comprising a skeletal frame and a blind top panel comprising fabric portions for concealing a hunter.

In order to overcome the limitations here stated, the present invention provides a portable hunting blind for concealing a hunter, comprising a skeletal frame for supporting a wind blocker that makes a wall and at least one blind top panel. The frame comprises a plurality of modular, interconnectable and adjustable tubular elements. The interconnectable tubular elements are connectable to provide the skeletal frame having the dimensions of a blind for use in a hunting environment. The skeletal frame and the plurality of windblocker portions have a portable and modular construction and a weight sufficiently light for a hunter to carry into a field for assembling into the blind for a hunting trip.

At least one of the plurality of fabric portions for use with the at least one blind top panel provides a see-through mesh for permitting a hunter to see flying game while concealing the hunter behind the at least one blind top panel. Additionally, at least a plurality of the fabric portions for use in forming the plurality of blind side panels and the at least one blind top panel further include a plurality of brush straps for holding field brush for camouflaging the blind in a field environment. Here, the blind side panels interconnect to provide a camouflaged wall perimeter for concealing at least one hunter from flying or land-based game during a hunt. Here, the camouflaged wall perimeter includes a front gate portion for allowing the at least one hunter to exit the blind, such as after shooting game. A blind top panel adjustment mechanism comprises a plurality of adjustable support structures for firmly, but releasably, engaging the at least one blind top panel for permitting either the flipping back of the blind top panel or holding the blind top panel horizontal at a plurality of heights relative to the top portion of the camouflaged wall perimeter. Those heights range from flush with the top of the camouflaged wall perimeter to sufficiently above the camouflaged wall perimeter for permitting the hunter to be covered by the at least one blind top panel, while viewing clearly outside and above the blind to see flying or land-based game during the hunt.

The see-through mesh top allows the hunters to lean away from the front opening of the blind, beneath the see-through top and look upwards, without being detected by the waterfowl. It also allows the hunters to keep eyes on what the ducks are doing.

The portable hunting blind configuration allows for the blind top panel to be thrown up and behind the hunters. Because of this feature, hunters never lose visual track of the birds. When the top is thrown back, the blind top panel impedes rear exiting of the portable hunting blind. In addition, when the at least one blind top panel is thrown back on itself, the portable hunting blind provides a front wall door/gate that makes exiting of the portable hunting blind simple and easy.

According to one aspect of the presently disclosed subject matter, there is provided an improved portable hunting blind as herein described.

In view of the above, it is an object of the present invention to provide a portable hunting blind, which can be used for field hunting.

It is another object to provide a portable hunting blind that allows the hunters to use the entire front to back and end to end at the top of the portable hunting blind for spotting birds and to be able to throw up the top and exit the portable hunting blind.

It is another object to provide a portable hunting blind including a front wall door/gate that make exiting the portable hunting blind easy when the top is thrown back on itself.

Other objects, technical aspects and advantages of the presently disclosed portable hunting blind or seat with simple, reliable, and quick setup and take-down hunting and other outdoor sporting activities will become apparent upon reading the technical description appearing below.

BRIEF DESCRIPTION OF THE DRAWINGS

The present subject matter will now be described in detail with reference to the drawings, which are provided as illustrative examples of the subject matter so as to enable those skilled in the art to practice the subject matter. It will be noted that throughout the appended drawings, like features are identified by like reference numerals. Notably, the FIGURES and examples are not meant to limit the scope of the present subject matter to a single embodiment, but other embodiments are possible by way of interchange of some or all of the described or illustrated elements and, further, wherein:

FIGS. 5A, 5B and 5C depict various aspects of a center bracket used for mounting to end panels (FIG. 4A), and mounting a front top panel and rear top panel to the two center brackets (FIGS. 5B and 5C);

FIG. 6 illustrates a corner support bracket used for mounting the front top panel or the rear top panel;

FIGS. 7A through 7C show various aspects of a latch for the presently disclosed blind top panel of the portable hunting blind;

DETAILED DESCRIPTION OF ILLUSTRATIVE EMBODIMENTS

The detailed description set forth below in connection with the appended drawings is intended as a description of exemplary embodiments in which the presently disclosed subject matter can be practiced. The term "exemplary" used throughout this description means "serving as an example, instance, or illustration," and should not necessarily be construed as preferred or advantageous over other embodiments. The detailed description includes specific details for providing a thorough understanding of the presently disclosed method and system. However, it will be apparent to those skilled in the art that the presently disclosed subject matter may be practiced without these specific details. In some instances, well-known structures and devices are shown in functional or conceptual diagram form in order to avoid obscuring the concepts of the presently disclosed portable hunting blind.

In the present specification, an embodiment showing a singular component should not be considered limiting. Rather, the subject matter preferably encompasses other embodiments including a plurality of the same component, and vice-versa, unless explicitly stated otherwise herein. Moreover, the applicant does not intend for any term in the specification or claims to be ascribed an uncommon or special meaning unless explicitly set forth as such. Further, the present subject matter encompasses present and future known equivalents to the known components referred to herein by way of illustration.

Although the present disclosure provides a description of a portable and modular hunting blind, it should be understood that the description is by way of example only and is not to be construed in a limiting sense. It is to be further understood that numerous changes may arise in the details of the embodiments of this portable and modular hunting blind. It is contemplated that all such changes and additional embodiments are within the spirit and true scope of this disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 1:
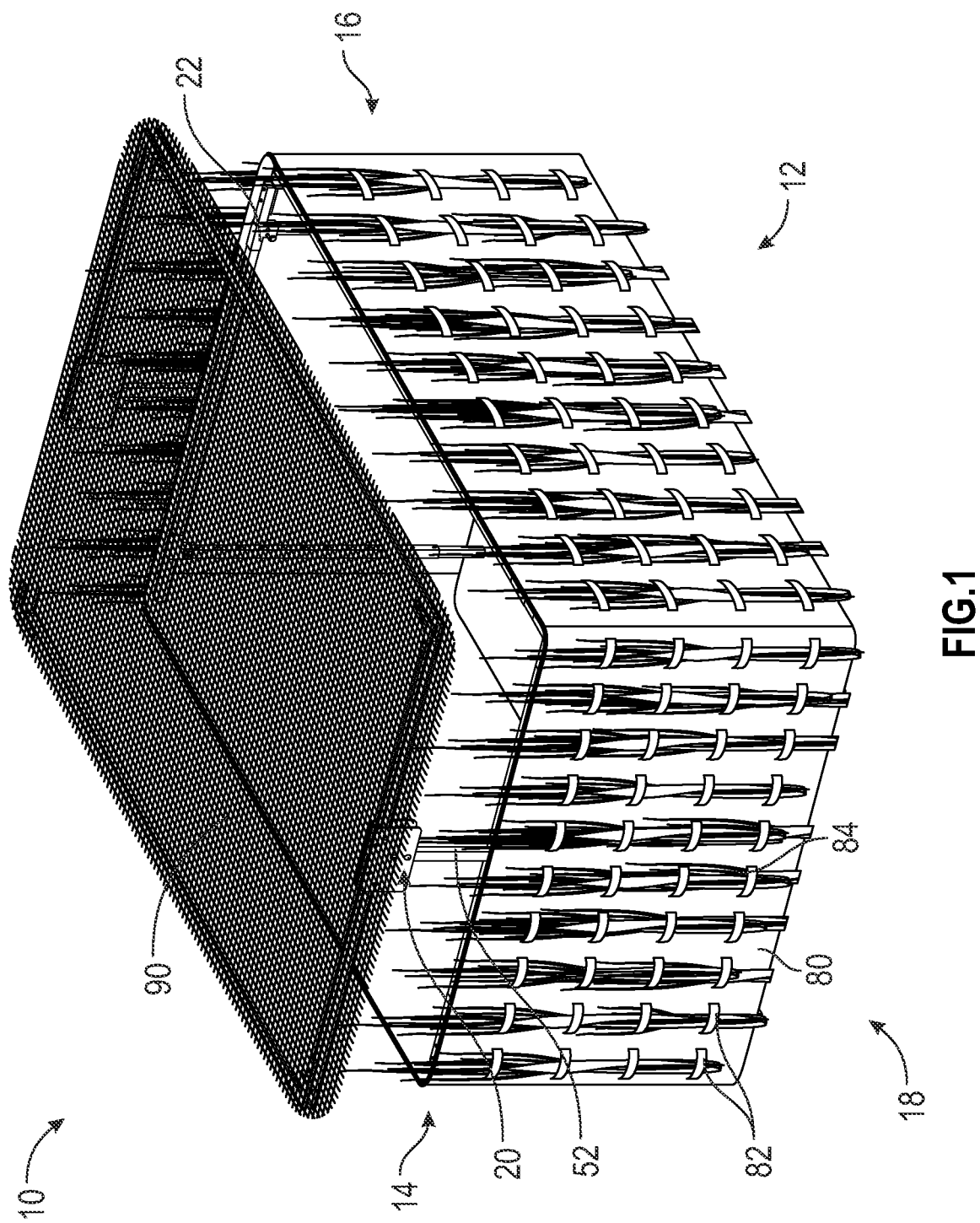
FIG. 1 shows an elevated perspective view of an embodiment of a smaller configuration portable hunting blind of the present disclosure.

For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a perspective view of a portable hunting blind 10 is shown, in accordance with one embodiment of the present invention. FIG. 1 illustrates an embodiment of a 6.5' or an 8.5' portable hunting blind 10, however the dimensions specified herein should not be construed in a limited sense. Portable hunting blind 10 provides a skeletal frame 20, a blind or wind blocker 80 and a blind top 90. Portable hunting blind 10 includes a front side 12, a rear side 14, a right side 16 and a left side 18. It should be understood that front side 12, rear side 14, right side 16 and left side 18 herein are used for illustrating sides of portable hunting blind 10 and should not be construed in a limited sense.

Figure 2:
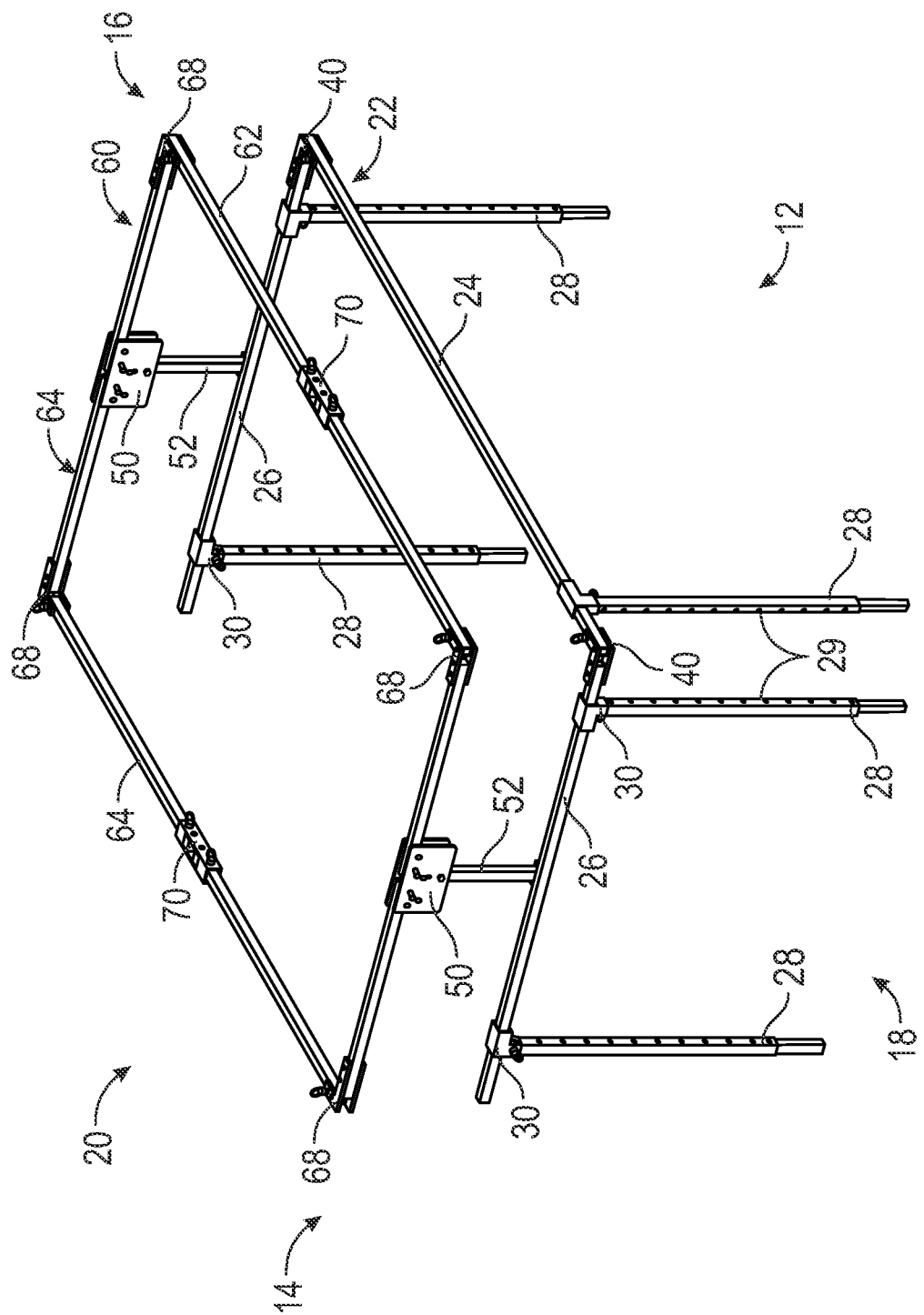
FIG. 2 provides an elevated perspective view of a skeletal frame of the portable hunting blind.

Referring to FIG. 2, a perspective view of skeletal frame 20 is shown, in accordance with one embodiment of the present invention. Skeletal frame 20 provides a blind side panel 22 and a blind top panel 60. Blind side panel 22 may indicate a main frame and blind top panel 60 may indicate a top frame mounted over blind side panel 22. Blind side panel 22 includes a front panel 24 and end panels 26 mounted to front panel 24. Front panel 24 indicates a panel or wall provided at front side 12. An end panel 26 indicates a panel provided at right side 16 or left side 18. Front panel 24 and end panels 26 may be made with aluminum square tubing. As can be seen, each of front panel 24 and end panels 26 provides legs 28 allowing front panel 24 and end panels 26 to be placed at a height from the ground. In the current embodiment, each of legs 28 is mounted to front panel 24 and end panels 26 using a socket 30.

Figure 3:
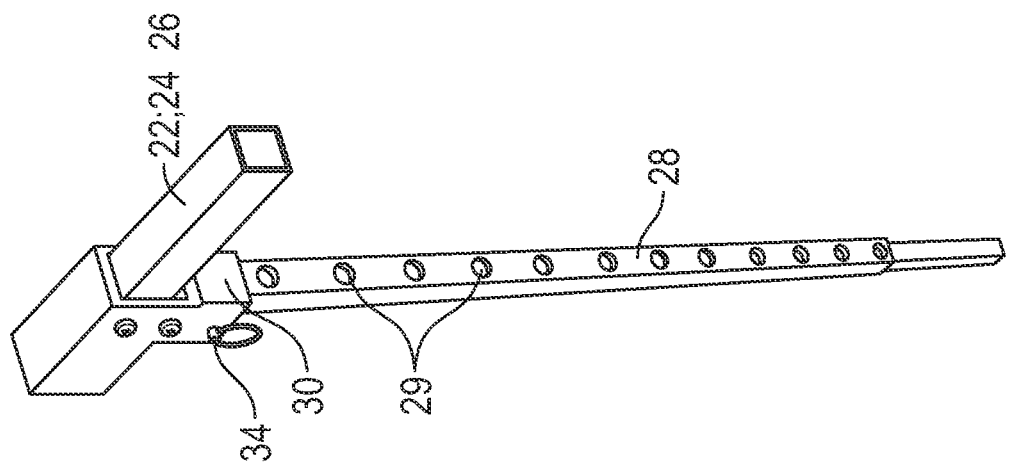
FIG. 3 illustrates a socket arrangement for the adjustable height mechanism of the portable hunting blind.

Referring to FIG. 3, a leg 28 mounted to front panel 24 is shown, for example. Each leg 28 is adjustable and includes the use of 1" square tubing and ¾" tubing that telescope. As can be seen, each leg 28 includes holes 29 for providing adjustable height mechanism for front panel 24 and/or end panels 26. The height of each leg 28 is adjustable by inserting a pushpin 34 into a hole 29 provided on leg 28. It should be understood that the height of each of legs 28 may be adjusted such that portable hunting blind 10 may be set on uneven ground or on a levee where the legs provided at the ends or rear side need to be shorter than the legs provided at the front side, or vice versa.

Figure 4A:
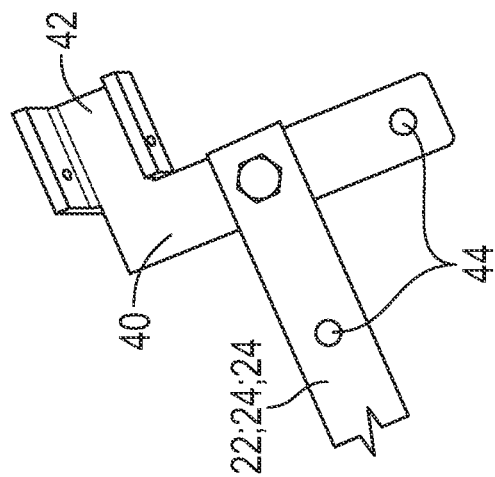
FIGS. 4A and 4B illustrate aspects of a connecting bracket for the portable hunting blind.
Figure 4B:
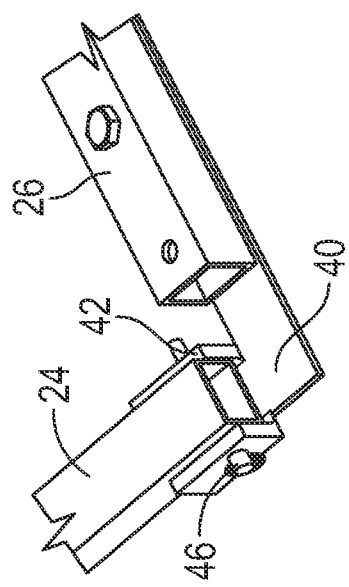

Further, front panel 24 and end panels 26 are connected using a connecting bracket 40. Particularly, front panel 24 and end panel 26 at right side 16 are connected using connecting bracket 40. Similarly, front panel 24 and end panel 26 at left side 18 are connected using connecting bracket 40. Referring to FIGS. 4A and 4B, connecting bracket 40 is shown. FIG. 4A shows connecting bracket 40 disconnected and where it attaches to front panel 24 after detachment into 2 halves. FIG. 4B shows connecting bracket 40 pivoted/turned 90 degrees. As can be seen, one end of connecting bracket 40 provides a receiving section 42 and another end includes a hole 44. For instance, receiving section 42 may be used for mounting front panel 24 and hole 44 may be used for mounting end panel 26 provided at right side 16 with the help of a fastener or a pin 46. Alternatively, receiving section 42 may be used for mounting end panel 26 and hole 44 may be used for mounting front panel 24 with the help of fastener 46.

Skeletal frame 20 further provides a center bracket 50 used for mounting blind side panel 22 and blind top panel 60. Center bracket 50 is mounted to blind side panel 22 using a connecting rod 52. Specifically, connecting rod 52 is mounted to end panel 26 with the help of a center bracket socket 56 as shown in FIG. 5A. As can be seen, connecting rod 52 may be provided with holes 54. In one implementation, a height of center bracket 50 from blind side panel 22 may be adjusted. In order to facilitate height adjustment, a pin 58 may be inserted into a hole 54 of connecting rod 52 and center bracket socket 56.

Blind top panel 60 includes a front top panel 62 and a rear top panel 64. Front top panel 62 and rear top panel 64 may be made of aluminum round or square tubing, however other shapes may also be used. Front top panel 62 and rear top panel 64 are provided in a U-shape configuration. Each of front top panel 62 and rear top panel 64 is pivotally mounted to center brackets 50 provided at far sides. FIGS. 5A, 5B and 5C show front top panel 62 and rear top panel 64 pivotally mounted to center bracket 50 with the help of a fastener or pin 66. As specified above, front top panel 62 and rear top panel 64 are provided in a U-shape configuration. In order to connect the corner rail/panel of front top panel 62 or rear top panel 64, a corner support bracket 68 may be used. FIG. 6 shows corner support bracket 68 used for connecting corner rails/panels using fasteners 69. Further, latches 70 may be used for joining smaller rails/panels forming the elongated portion of the U-shape structure of front top panel 62 or rear top panel 64. FIGS. 7A, 7B and 7C show latch 70 used for joining the smaller/shorter rails/panels. In one example, the rails may be pinned to latch 70 using fasteners 72 or left loose in latch 70.

Figure 8:
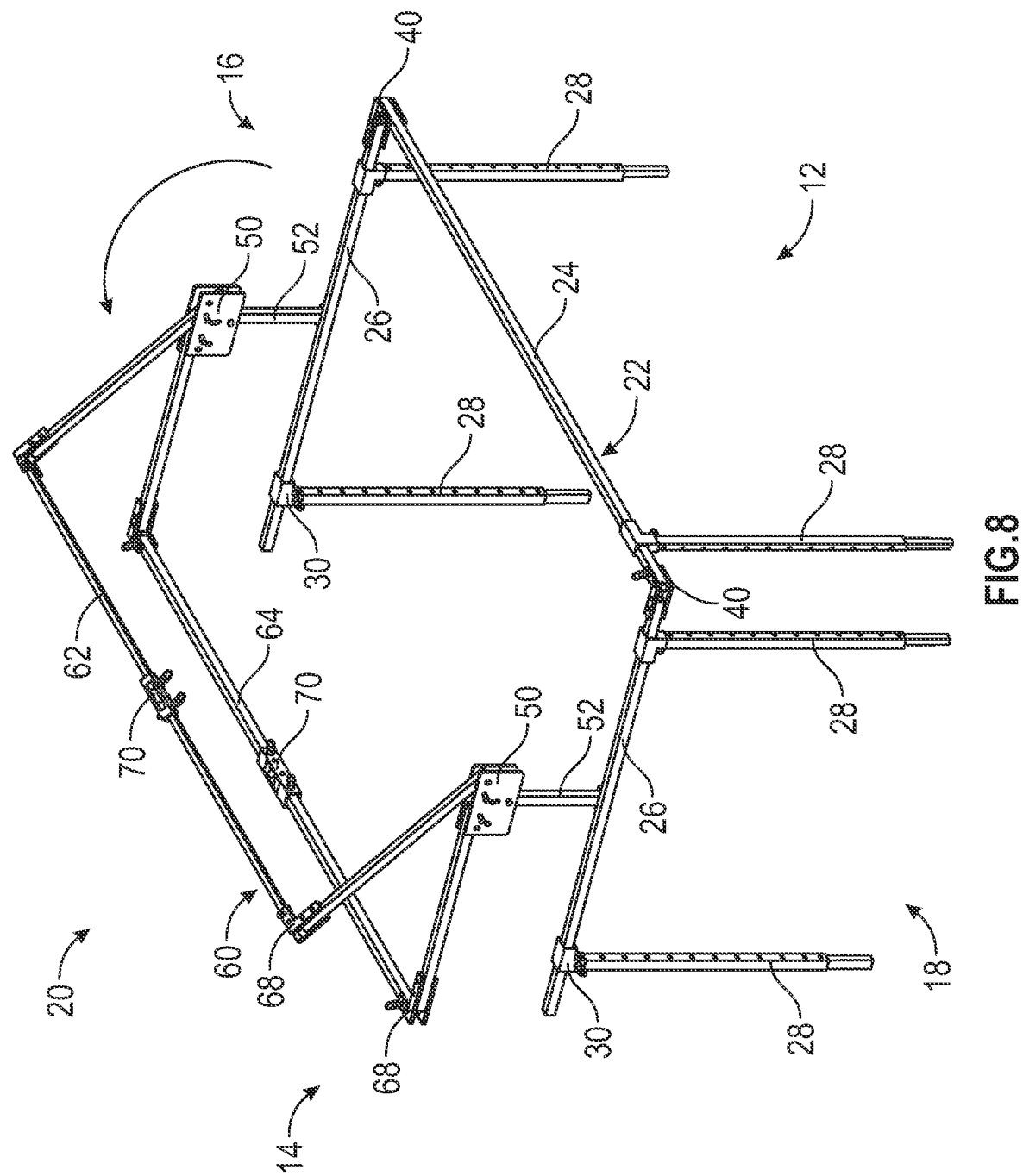
FIG. 8 illustrates an aspect of the presently portable hunting blind including the ability to fold back the blind top panel.

The construction of center brackets 50 provides pivot points for front top panel 62 and rear top panel 64 to form one dual-action top. As such, front top panel 62 can be thrown back towards rear top panel 64, or vice versa. FIG. 8 shows an aspect of portable hunting blind 10, which has an ability to throw back blind top panel 60. Specifically, FIG. 8 shows front top rail 62 thrown back over rear top panel 64. By allowing front top panel 62 to be thrown back, portable hunting blind 10 provides an exit point from front side 12 of portable hunting blind 10. Similarly, rear top panel 64 can be thrown back for providing an exit point from rear side 14 of portable hunting blind 10.

Figure 9:
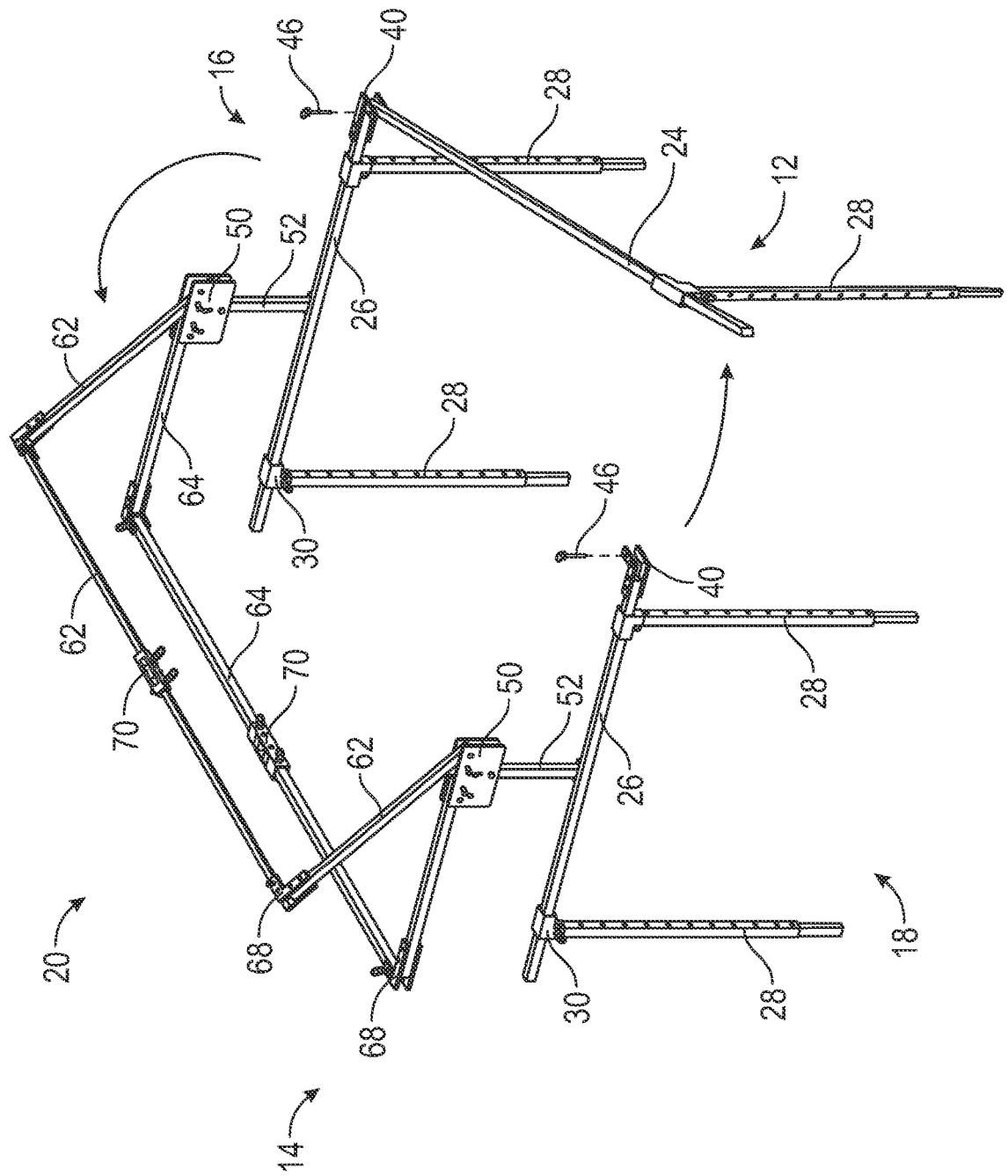
FIG. 9 illustrates a further aspect of the presently disclosed portable hunting blind including the ability to use the front panel of the portable hunting blind as a gate for leaving the portable hunting blind.

When front top panel 62 is thrown back, front panel 24 can be used as a gate for leaving portable hunting blind 10. As can be seen from FIG. 9, opening of front panel 24 for exiting portable hunting blind 10 is shown. In order to open front panel 24 to exit portable hunting blind 10, a user or hunter may release fastener 46 from connecting bracket 40 which allows front panel 24 to open outward allowing the user to walk straight out-front side 12 of portable hunting blind 10. In other words, front panel 24 opens outward similar to a front gate and allows the user to walk straight out-front side 12 of portable hunting blind 10.

Portable hunting blind 10 further provides a wind blocker or blind or skirt 80 put around skeletal frame 20 to envelope skeletal frame 20, as shown in FIG. 1. Windblocker 80 may be made up of fabric material that is windproof. Windblocker 80 is secured to blind side panel 22, i.e., to first panel 24 and end panels 26 while also covering rear side 14. In order to secure windblocker 80 to front panel 24 and end panels 26, for instance, a user of portable hunting blind 10 may stretch windblocker 80 and secure it to the back of each end. Windblocker 80 is suspended to block wind and provide concealment. It should be understood that blind side panel 22 together with windblocker 80 interconnect to provide a camouflaged wall perimeter for concealing the hunter from flying or land-based game during a hunt. The wind blocking functions of windblocker 80 deliver 360-degree wind protection and concealment. In other words, windblocker 80 when put around skeletal frame 20 forms a wall around skeletal frame 20. Further, windblocker 80 includes a plurality of brush straps 82 located around the outer edge of windblocker 80. The plurality of brush straps 82 may be sewn into windblocker 80 or may be attached to windblocker 80 using known mechanisms. Brush straps 82 allow the user to tie brush 84. In one implementation, brushes 84 are tied around the edges of blind top panel 60 for camouflaging portable hunting blind 10 in a field environment thereby creating a more natural look. Brush straps 82 breakup the hard edges of the gap formed between blind side panel 22 and blind top panel 60, and make portable hunting blind 10 look more natural, while allowing the hunters to look 360-degrees unencumbered, all while still having a top directly overhead.

In one embodiment, windblocker 80 may include grommets and bolt heads on the wall of skeletal frame 20. This permits quickly and easily slipping the grommet over the head to secure windblocker 80. Further, brush straps 82 may be used to support the use of grass or vegetation around windblocker 80 to conceal portable hunting blind 10.

Further, portable hunting blind 10 provides a blind top 90 mounted to blind top panel 60. Blind top 90 includes see-through mesh netting or windblocker that can be used at the top of portable hunting blind 10, which conceals the hunter inside, but also allows some visibility when birds are directly overhead. In other words, blind top panel 60 includes a blind top 90 indicative of a windblocker or a see-through mesh for permitting a hunter to see flying game while concealing the hunter behind blind top panel 60. Blind top 90 along with blind top panel 60 when extended/unfolded fully or thrown back/folded hold its shape.

Figure 10:
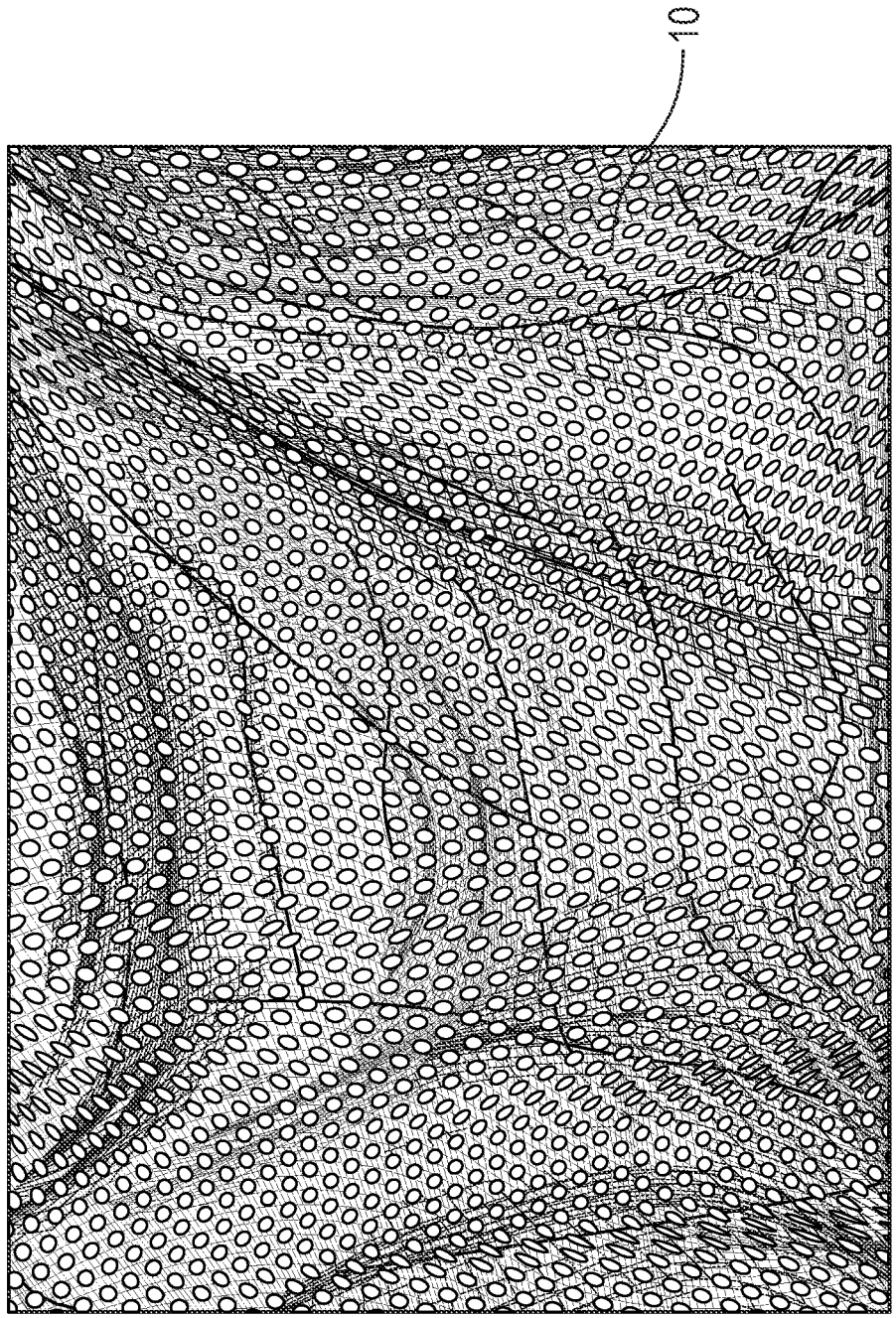
FIG. 10 shows an exemplary bottom up view of the mesh top structure, i.e., blind top of the presently disclosed portable hunting blind.

FIG. 10 shows an exemplary bottom up view of blind top 90 for the presently disclosed hunting blind. Blind top 90 may include a sheet-like structure mounted over blind top panel 60. As can be seen from FIG. 1, blind top 90 covers the entire area of portable hunting blind 10, front to back and end to end. Blind top 90 folds when front top panel 62 or rear top panel 64 is thrown back thereby allowing the hunter to have a partial open top.

In order to use, a user or hunter may place portable hunting blind 10 in a hunting ground. With the presently disclosed portable hunting blind 10, each leg 28 is adjustable. As such, portable hunting blind 10 may be set on uneven ground or on a levee where the rear legs need to be shorter than legs 28 provided at front side 12. To address this situation, another feature here provided, includes adjustable height legs. The presently disclosed portable hunting blind 10 adjusts so that hunters may sit on the ground and hunt using the top. Alternatively, the height of portable hunting blind 10 may be adjusted to permit the hunter to sit in a chair and then stand up easily when shooting. The presently disclosed subject matter therefore provides the highly attractive and novel aspect of portable hunting blind 10. When coupled with the ability of making each leg individually and separately adjustable, the present portable hunting blind 10 offers features not herein provided for a blind. This feature satisfies the needs to address the situation of uneven surfaces or hunting from a blind on a hill or sloped surface or when the terrain demands a lower profile closer to the ground.

In one preferred embodiment of the present subject matter, providing adjustable legs includes the use of telescopic tubing. The preferred embodiment uses spring buttons whereby the user depresses and adjusts the height. This skeletal frame adjusts from about 30" to 50", not counting the top. This is a major advantage and substantially improved functionality over known hunting blinds. This functionality also provides for "leveling" the blind to ensure that its use is most enjoyed. Frequently, hunters desire to hunt on a levee or hill. This makes the blind uneven and its use less than optimal. There is the need to be able to lower the rear or end legs and keep the front taller. In addition, often times the field may have a slope. Hunters generally desire that the blind be level. The ability with presently disclosed portable hunting blind 10 to adjust legs 28 to level portable hunting blind 10 makes the hunt much more enjoyable and comfortable. With a more enjoyable and comfortable hunt, the likelihood of better game returns increases the benefit of members of the hunting party.

Another major advantage to adjustable legs is a lower profile. When legs 28 are set lower to 30" or so, the total profile of the portable hunting blind 10 lowers to under 38-40". This requires hunters to sit on the ground and hunt from a sitting position, which is one of the most successful styles of field hunting. Often times, grass/brush or the terrain doesn't support blinds that are fully upright reaching 54-60" of height. In those situations, to be able to lower the height of portable hunting blind 10 to as low a profile possible, while still having a top provides an ideal hunting experience. The adjustability of the present portable hunting blind 10 provides this greater enjoyment.

Generally, hunters like their views to be unencumbered. Looking through mesh can be difficult, and some people have depth perception issues which makes looking through mesh uncomfortable. Blind top panel 60 along with blind top 90 allows the user to create an open-air gap around the perimeter of portable hunting blind 10: a small or large gap, as he may choose. In the preferred embodiment, sewn brush straps 82 are located around the outer edge perimeter of blind top 90. These brush straps 82 allow the user to tie brush 84 around the edges of blind top 90, creating a more natural look.

In another embodiment, blind top panel 60 is fully adjusted, from top down such that no gap exists between blind top panel 60 (blind top 90) and windblocker 80, and the hunter always looks through blind top 90 for spotting the game. Similarly, blind top panel 60 may be raised for creating an open-air gap between blind top panel 60 (blind top 90) and windblocker 80 (blind side panels 22) for allowing the hunter to spot game from a far distance.

Brush straps 82 breakup the hard edges of the gap and make portable hunting blind 10 look more natural, while allowing the hunters to look 360-degrees unencumbered, all while still having a top directly overhead. In use, blind top 90 is directly overhead where most hunters flare/spook the birds when they are directly overhead. The gap allows the hunters to see birds off in the distance. The further off in the distance are the birds the more difficult it is to gauge how far they actually are if you're looking through mesh. As the birds approach portable hunting blind 10, the hunters can lean back beneath blind top 90, when the birds are directly overhead. They can turn and follow the birds without spooking the birds. This greatly enhances all hunters' enjoyment, because watching birds in-flight provides some of the most enjoyable aspects of the wildlife hunting experience.

Blind top 90 uses a see-through mesh that allows the hunters to see out and the birds not to see in. Ducks/geese are constantly looking for predators or inconsistencies in the terrain. Blinds without tops, when combined with the sun, the angle of the sun when hitting the outer wall of the blind, this creates a shadow inside the blind. When birds are overhead, they can see these dark shadows. This is not natural in open fields. On top of this, birds overhead may see numerous hunters in the blind, all moving, turning their heads, and trying to follow the birds' flight path. Often times, a guide or lead hunter will instruct their group to keep their heads down. Not all hunters are disciplined or experienced enough to do this properly. It's hard to control the movement when four to six hunters occupy the blind.

Blind top 90 of presently disclosed portable hunting blind 10 eliminates the shadow and the movement problems with known hunting blinds. The result is a better blind that will materially benefit the hunter to achieve a successful hunting experience.

Also, when birds are about to land, the majority of the time portable hunting blind 10 is positioned where the front of portable hunting blind 10 is facing where the birds will most likely land based on the wind and the decoy locations. As a result, with the birds not being directly overhead, the hunter can lean forward and see the ducks unencumbered through the gap and hanging brush 84. The gap allows the hunter to watch the birds as they approach to land and because the top throws back. In this situation, the hunter may throw back blind top panel 60, i.e., either front top panel 62 or rear top panel 64 without ever losing sight of the birds he is planning to shoot.

As specified above, blind top panel 60 comprising blind top 90 covers the entire area of portable hunting blind 10, i.e., front to back and end to end. Blind top panel 60 pivots from each end to allow only one person to engage blind top panel 60 for all hunters in portable hunting blind 10, instead of multiple tops per hunter. Blind top panel 60 of the present portable hunting blind 10 opens to the rear and front and remains inside the perimeter of portable hunting blind 10, without falling outside portable hunting blind 10. Designing blind top panel 60 so it throws behind the hunter allows blind top panel 60 to open without ever impeding the hunter's view of the birds while shooting.

When blind top panel 60 is thrown back, the hunters may stand and have plenty of room to shoot out the front. With the disclosed subject matter, blind top panel 60 folds on top of itself and remains inside the walls of windblocker 80. Blind top panel 60 comprising blind top 90 does not contact outer wall brush 84. Alternatively, blind top panel 60 can be designed to fall forward outside of windblocker 80. Many hunters prefer tall wavy brush. If tall brush stands against outer wall of windblocker 80, then blind top panel 60 comprising blind top 90 cannot fall outside of windblocker 80 because it will hit brush 84. Thus, it is preferred to allow blind top panel 60 comprising blind top 90 to fall onto the front or back half remaining inside the confines of the perimeter to not come in contact with brush 84.

After throwing back blind top panel 60 (front top panel 62), front panel 24 may be used as a front gate for allowing the hunter to exit portable hunting blind 10. Front panel 24 opens outward like a gate. By operating front panel 24 similar to a front gate, when the hunter stands and shoots game, it allows him/her to keep eyes on the game/birds. The hunter can simply grab the gate, i.e., front panel 24, lift and never take eyes off the game. Corner connecting brackets 40 serve as an attachment point and as a door/gate hinge. Similarly, corner connecting brackets 40 allow each front or end panel to also act as a rear gate. This surely helps minimize losing game in the field. In addition, this makes possible quickly returning to the game. The longer it takes a hunter to exit a blind the greater will be the chance to lose the game.

In order to exit portable hunting blind 10 from rear side 14, the hunter may throw back rear top panel 64 over front top panel 62 and disconnect windblocker 80 to walk out the back. With presently disclosed portable hunting blind 10 design, front and rear walls of windblocker 80 provide exit points. This allows the ends to have a top and pivot. Another advantage of exiting front side 12 of portable hunting blind 10 is that, typically, the game just harvested is usually in front of portable hunting blind 10. In leaving windblocker 80, the hunter may simply lift the front wall of portable hunting blind 10 out of the latch/cup and push for easy exiting of windblocker 80. The rear of windblocker 80 operates similarly, without a gate.

Another technical advantage of presently disclosed portable hunting blind 10 becomes apparent when hunters are forced to exit the side of blinds 80, i.e., from right side 16 and left side 18. For example, in a situation where five to six hunters are sitting on stools, side-by-side, with shell bags beside them etc., exiting windblocker 80 can be challenging. Trying to walk around the stools and not step on bags is not easy. These tight spaces can be frustrating and sometimes there is bracing in the blind requiring hunters to get on the ground and crawl out. The ability to leave windblocker 80 through one of the installed gates/side panels alleviates this challenge.

Figure 12:
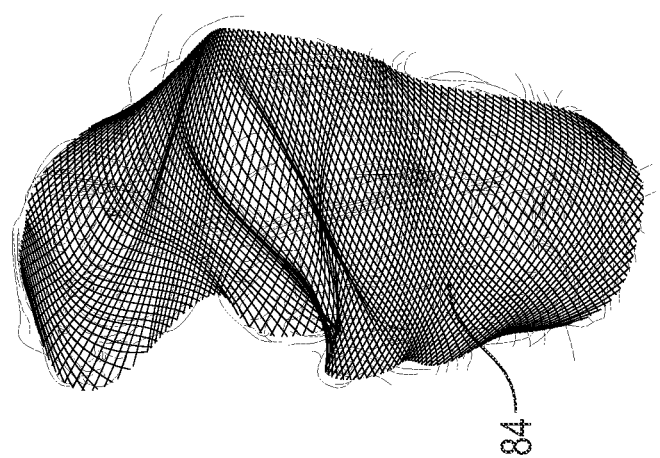
FIG. 12 illustrates a first stage extension from the fully-folded portable hunting blind of the present disclosure.
Figure 11:
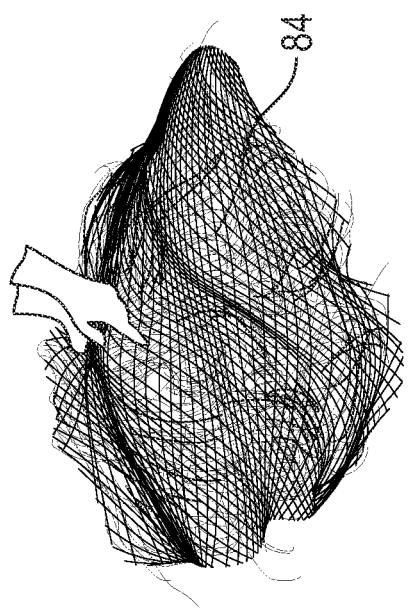
FIG. 11 illustrates the compact carrying configuration of the fully-folded portable hunting blind of the present disclosure.
Figure 13:
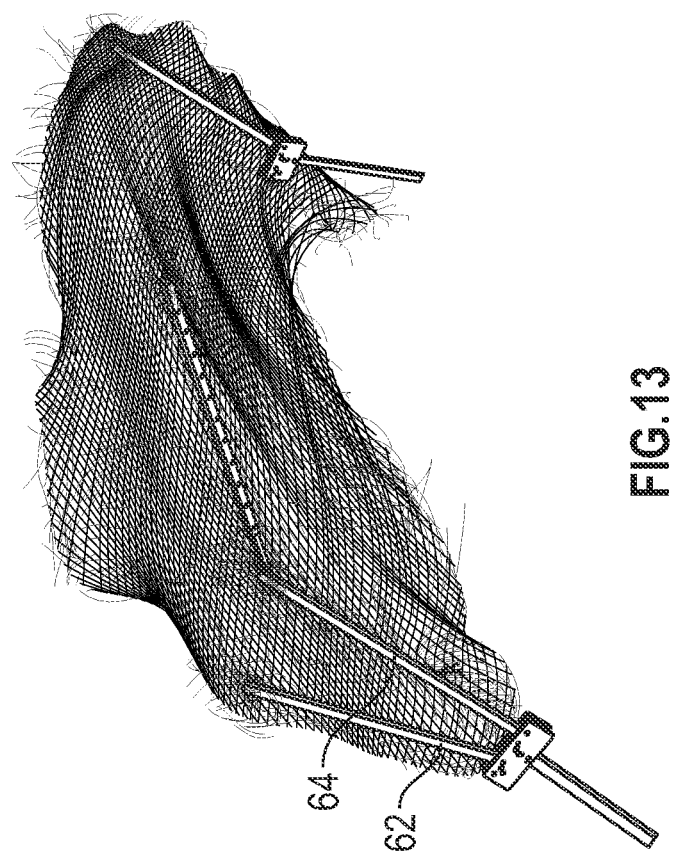
FIG. 13 illustrates the fully-extend, but not set-up configuration for the portable hunting blind of the present disclosure.

After hunting, the hunter may remove blind top panel 60 and separate in center bracket 50 with a spring button (not shown). This allows the hunter to quickly remove blind top panel 60 from portable hunting blind 10 and fold it in half to a manageable portable size. The remaining parts of portable hunting blind 10 are all connected and fold by hinges or brackets. This is a major advantage of the disclosed subject matter, as there are no loose parts or assembly. FIG. 11 shows a compact carrying configuration of fully folded portable hunting blind 10. FIG. 12 shows a first stage extension from fully folded portable hunting blind 10. FIG. 13 shows the fully-extended, but not set-up, configuration of the portable hunting blind 10.

Figure 14:
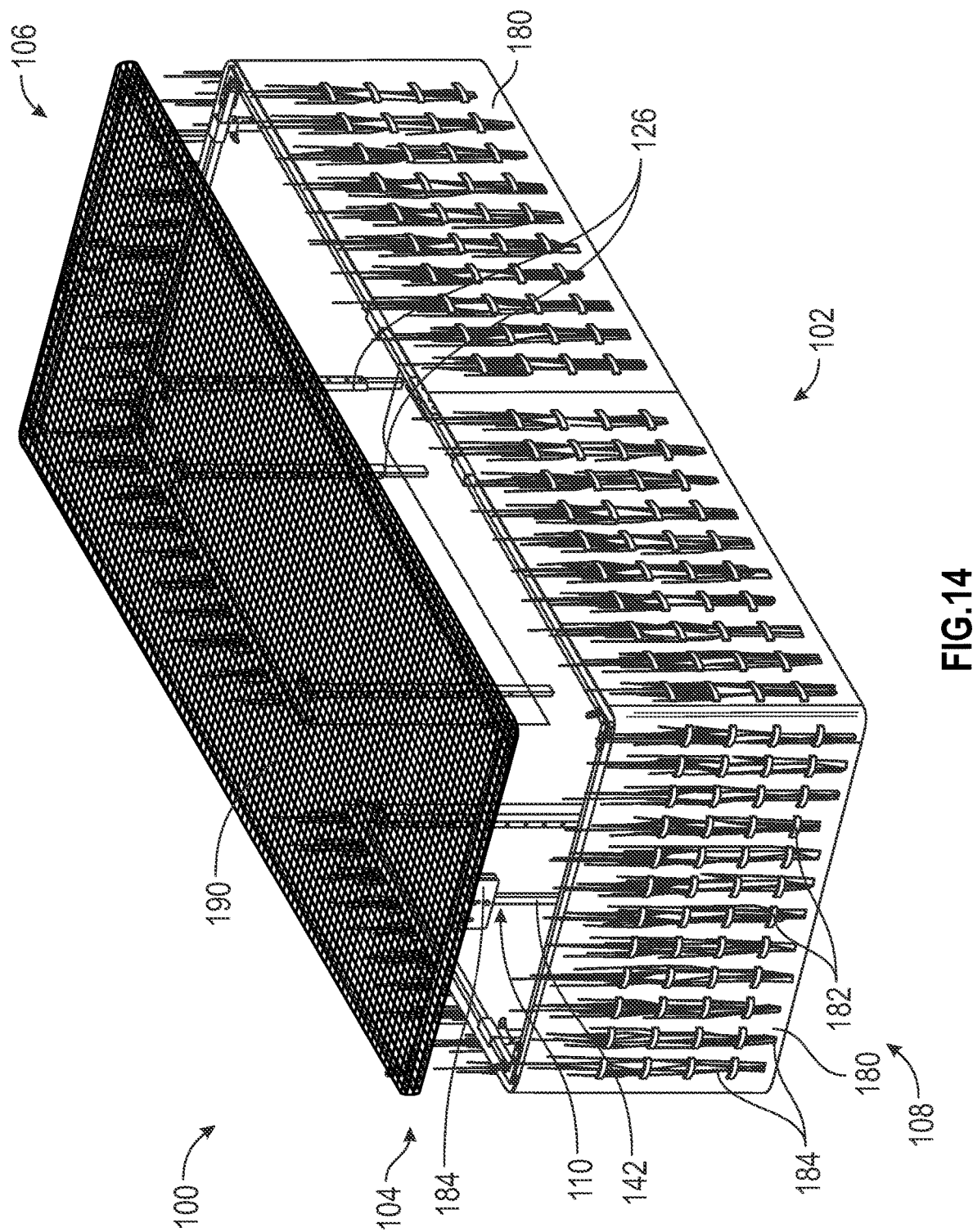
FIG. 14 illustrates a larger size configuration for a fully-erected embodiment of the presently disclosed portable hunting blind, in accordance with another embodiment.
Figure 16:
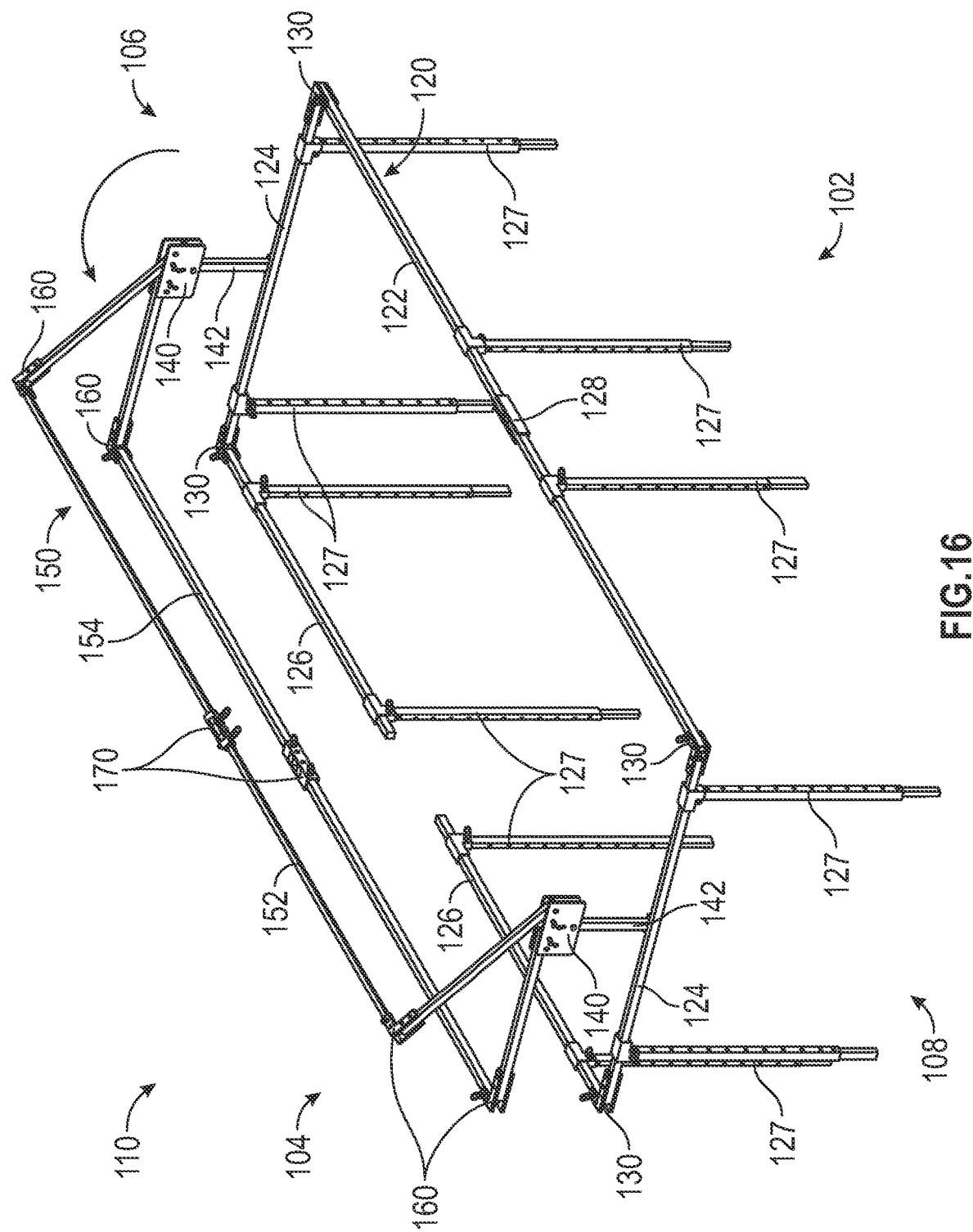
FIG. 16 illustrates how the larger configuration portable hunting blind of the present disclosure includes brackets and a movable blind top panel for controlling and permitting repositioning the larger portable blind top panel.

FIG. 14 shows a perspective view of a larger size configuration of a portable hunting blind 100, in accordance with another embodiment of the present invention. It should be understood that FIG. 14 shows a larger size configuration of, for example a 10.5' fully erected embodiment of portable hunting blind 100. It should be understood that the dimension specified herein should not be construed in limited sense as portable hunting blind 100 can be provided in an even larger or smaller than the dimension specified herein. In the 10.5' configuration, portable hunting blind 100 provides a modular blind with two front door/gates and two rear gates. The blind top panel works similar to blind top panel 60 explained above. In 10.5' configuration, the hunter can exit the front or rear. As can be seen in FIG. 16, skeletal frame has two doors/gates at the rear/back of portable hunting blind 100, in contrast to having only a windblocker 80 in the rear of the 6.5' and 8.5' configurations shown in FIG. 1. Further, the 10.5' configuration also provides two front gates that are modular and double as sidewalls. The 10.5' configuration enables removal of the two gates, separating the two front halves of the 10.5', and converting a single 10.5' into two 5.25' blinds, each with a separate blind top panel that operates as described above.

Often times, a hunting situation may call for a smaller, not a bigger, portable hunting blind. Smaller is better in numerous concealment hunting situations. Often times, the hunter does not have a good spot to place a larger blind where the birds want to be. Plus, using the smaller portable hunting blind gives added value by allowing a four-man blind to convert to a comfortable two-man blind.

The 10.5' configuration of portable hunting blind 100 provides a front side 102, a rear side 104, a right side 106 and a left side 108. Portable hunting blind 100 includes a skeletal structure 110, a blind side panel 120 and a blind top panel 150.

Figure 15:
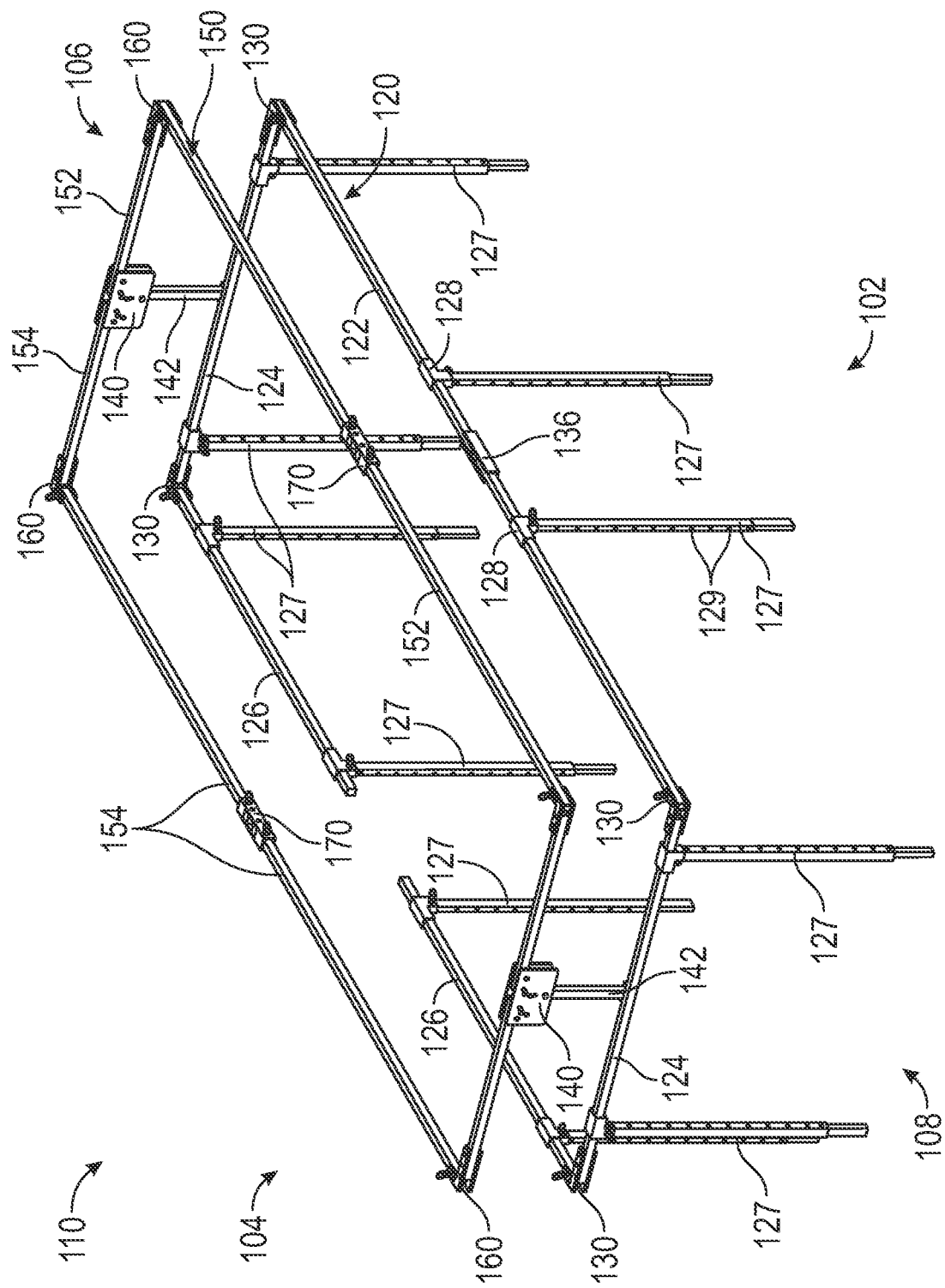
FIG. 15 provides a perspective view of a skeletal frame for the portable hunting blind of the present disclosure.

FIG. 15 shows a perspective view of skeletal frame 110, in accordance with present embodiment. Blind side panel 120 of skeletal frame 110 provides a front panel 122, each front panel 122 having a dimension of 5.25' and thus making front panel 122 to have 10.5' in length. Further, blind side panel 120 includes end panels 124 mounted to front panel 122. Further, blind side panel 120 provides two rear panels 126. As can be seen from the FIG. 15, rear panels 126 have about a 2' gap. This is because side depth of end panels 124 is 4' such that end panels 124 can also serve as a rear gate and they are modular, they are also 4' wide when they become a rear gate or an end panel/gate of the blind as it is one and the same part. The 8.5' configuration of the portable hunting blind shown in FIG. 1 can work the same way. In addition, the 8.5' configuration can be converted into a smaller 4.25'×4' blind with a smaller blind top panel. The modular nature of these end panels 124 allows the hunter the ability to convert modularly by going from an 8.5' blind to a smaller 4.25 (two-man blind) with a blind top panel comprising a blind top.

Similar to 8.5' configuration, each of front panels 122, end panels 124 and rear panel 126 of the 10.5' configuration of portable hunting blind 100 includes legs 127. Each of legs 127 is mounted to front panels 122, end panels 124 and rear panels 126 using a socket 128 (similar to socket 130 shown in FIG. 2). Further, each of legs 127 provides holes 129 facilitating height adjustment of blind side panel 120.

Front panels 122 are connected to end panels 124 using connecting brackets 130 (similar to connecting bracket 40 shown in FIG. 2). Similarly, end panels 124 and rear panels 126 are connected using connecting brackets 130. Each of the connecting brackets 130 includes a fastener or pin 132 for securing panels of the blind side panels. Further, blind side panel 120 provides a U-channel 136 for connecting the two 5.25' front panels 122.

Further, skeletal frame 110 includes center brackets 140 provided at end panels 124. Each of center brackets 140 is mounted to respective end panel 124 using a connecting rod 142. As specified above, skeletal frame 110 provides blind top panel 150. The construction and working of the blind top panel 150 is similar to blind top panel 60 explained above. As such, top panel blind 150 includes a front top panel 152 and a rear top panel 154 pivotally mounted to center brackets 140. Each of front panel 152 and rear top panel 154 is pivotally mounted to center brackets 140 provided at far sides. Front top panel 152 and rear top panel 154 are provided in a U-shape configuration. The corners of front top panel 152 and rear top panel 154 is mounted using a corner support bracket 160. Further, latches 170 may be used for joining smaller rails used for forming the elongated portion of the U-shape structure of front top panel 152 or rear top panel 154. As specified above, center brackets 140 acts as pivot points for front top panel 152 or rear top panel 154 to form one dual-action tops. As such, front top panel 152 can be thrown back towards rear top panel 154, or vice versa. FIG. 16 shows an aspect of portable hunting blind 100, which has an ability to fold back or throw back front top panel 152. By allowing front top panel 152 to be thrown back, portable hunting blind 100 provides an exit point from front side 102 of portable hunting blind 100.

Figure 17:
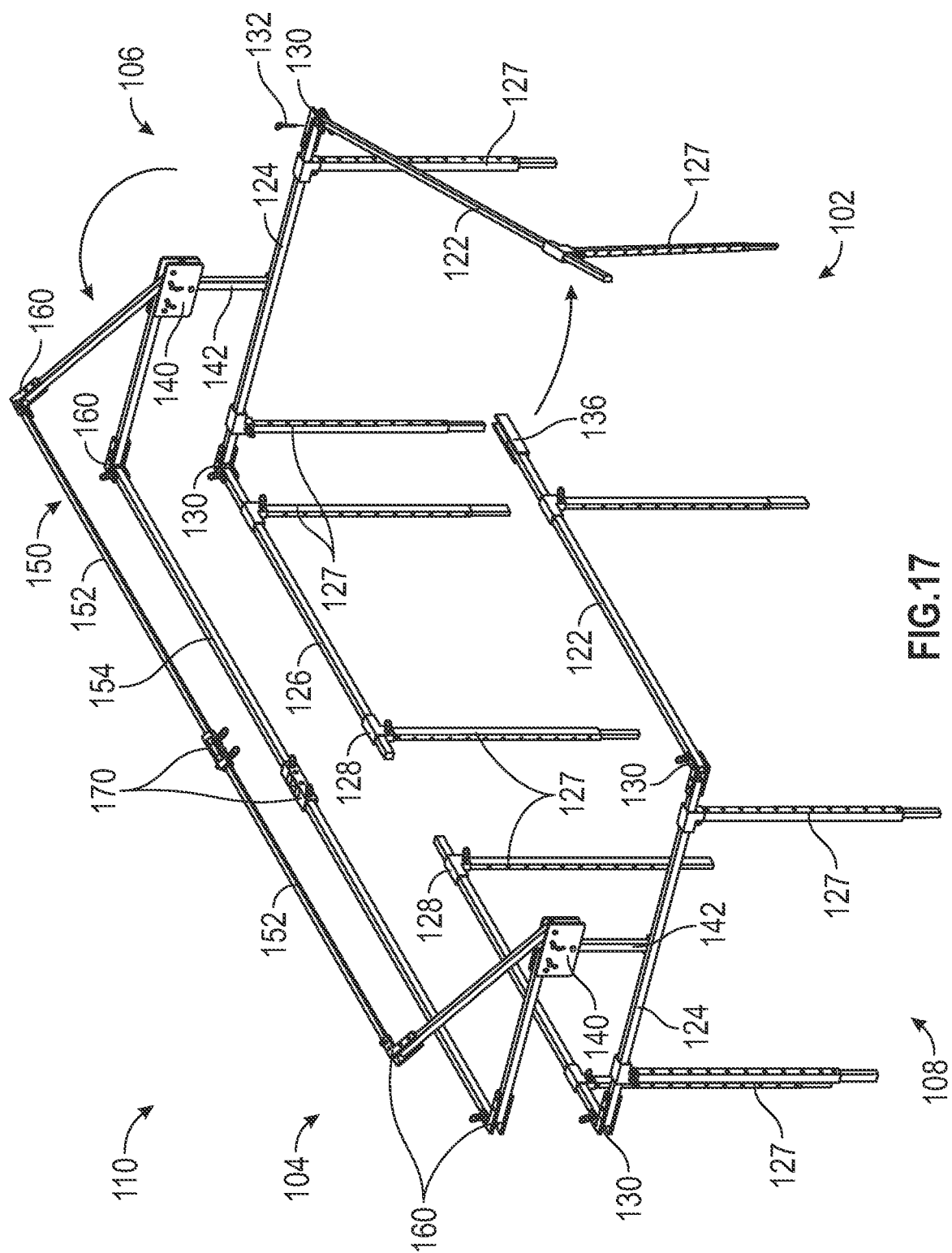
FIG. 17 shows the structures for the FIG. 16 embodiment for providing a gate at the front portion of the presently disclosed portable hunting blind.

When front top panel 152 is thrown back, front top panel 152 impedes rear exiting of portable hunting blind 100 and further allows front panel 122 to be used as a gate for leaving portable hunting blind 100. As can be seen from FIG. 17, opening of the 5.25' front panel 122 for existing portable hunting blind 100 is shown. In order to open the 5.25' front panel 122 to exit portable hunting blind 100, a user may simply lift front panel 122 from U-channel 136 for allowing the 5.25' front panel 122 to open outward thereby allowing the user to walk straight out-front side 102 of portable hunting blind 100.

Portable hunting blind 100 further provides a blind or wind blocker 180 put around skeletal frame 110 to envelope skeletal frame 110, as shown in FIG. 14. Wind blocker or blind 180, similar to windblocker 80 explained above, includes brush straps 182 located around the outer edge of wind blocker 180 for holding brushes 184. Further, portable hunting blind 100 provides a blind top 190, similar to blind top 90 explained above.

In order to exit from the rear/back, the hunter throws back rear top panel 154 and demounts windblocker 80 and exits through the gap provided at the back. Based on the above, the 10.5' configuration of portable hunting blind 100 provides two front door/gates and two rear gates and the blind top panel that works similar to the blind top panel explained above. In this configuration, the hunter can exit the front or rear. Further, the 10.5' configuration of portable hunting blind 100 also provides rear gates that are modular and double as sidewalls. This configuration enables removal of the two gates, separating the two front halves of the 10.5', and converting a single 10.5' into two 5.25' blinds, each with a separate top that operates as here described.

Figure 18:
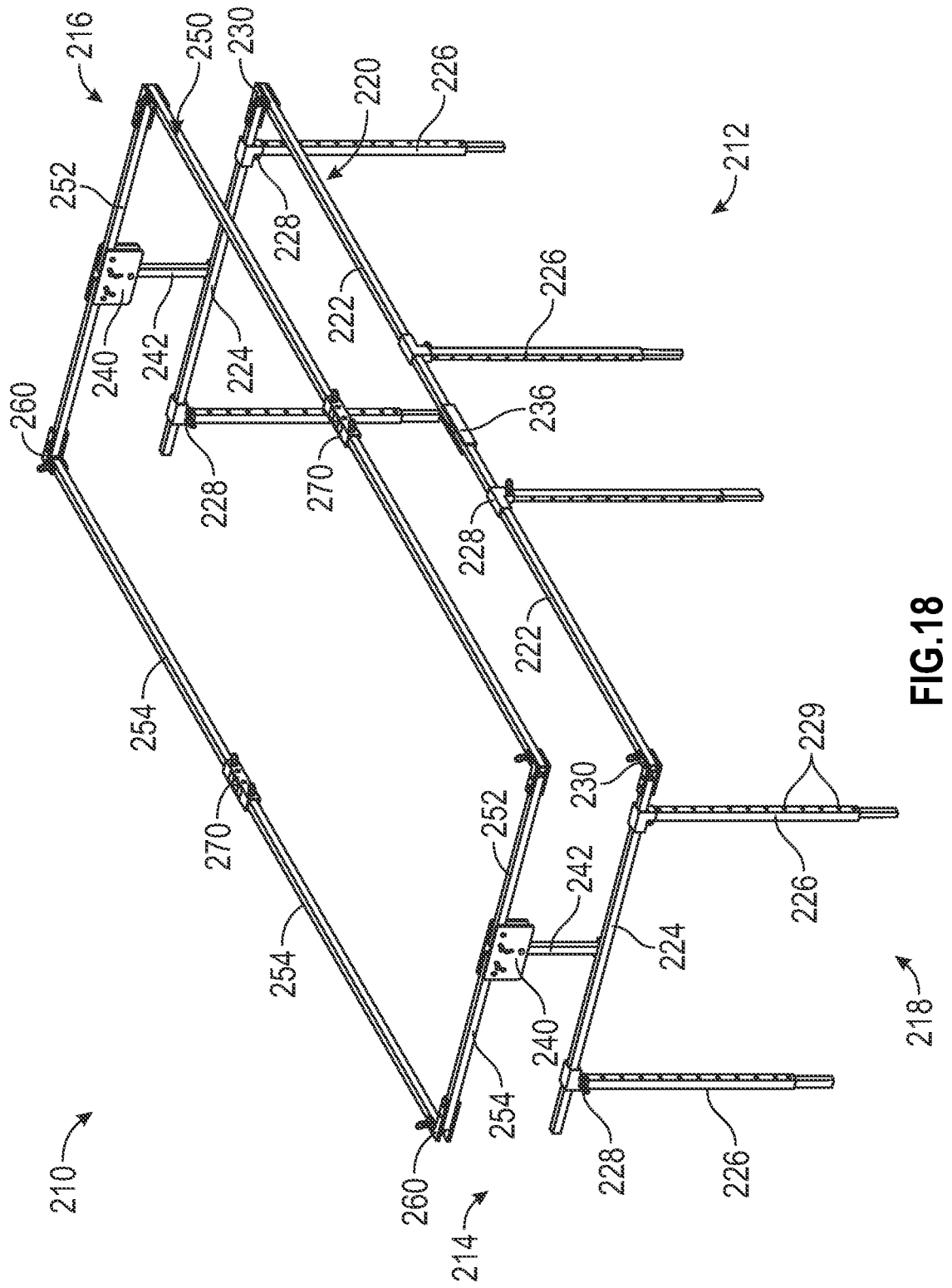
FIG. 18 depicts a further embodiment of the presently disclosed skeletal frame.

Now referring to FIG. 18, a longer configuration, for example a 10.5' skeletal frame 210 is shown, in accordance with another embodiment of the present invention. In the current embodiment, skeletal frame 210 is provided with two front panels/door/gates and no rear panel, in which the rear gate is served as a solid place to secure the blind, since the blind is 10.5' from end to end, heavy blinds need a frame to attach to and hold it up. The center gap will be bridged by blind that meets in the middle and is secured by a heavy-duty magnet. Making it easy to be detached when exiting the blind. In other words, the 10.5' skeletal frame 210 is similar to the 6.5' or 8.5' skeletal frame 120 explained above, having a provision for two gates, separating the two front halves of the 10.5' front panel, and converting a single 10.5' into two 5.25' blinds, each with a separate blind top panel that operates as described above.

The skeletal frame 210 includes a front side 212, a rear side 214, a right side 216 and a left side 218. The skeletal structure 210 provides a blind side panel 220 and a blind top panel 250. The blind side panel 220 includes front panels 222, and end panels 224. The front panels 122 include two panels, each having a dimension of 5.25' and thus making the front panel 122 10.5' configuration.

Further, each of the front panels 222 and the end panels 224 include legs 226. Each of the legs 226 is mounted to the front panels 222 and the end panels 224 using a socket 228 (similar to socket 130 shown in FIG. 2). Further each of the legs 226 provides holes 229 facilitating height adjustment of the blind side panel 220. The front panels 222 are connected to the end panels 224 using connecting brackets 230 (similar to connecting brackets 40 shown in FIG. 2). Each of the connecting brackets 130 includes a fastener or pin 232 for securing the rails.

Further the blind side panel 220 provides a U-channel 236 for connecting the two 5.25' front panels 222. The skeletal frame 210 includes center brackets 240 provided at the end panels 224. Each of the center brackets 240 is mounted to the respective end panels 224 using a connecting rod 242.

Figure 19:
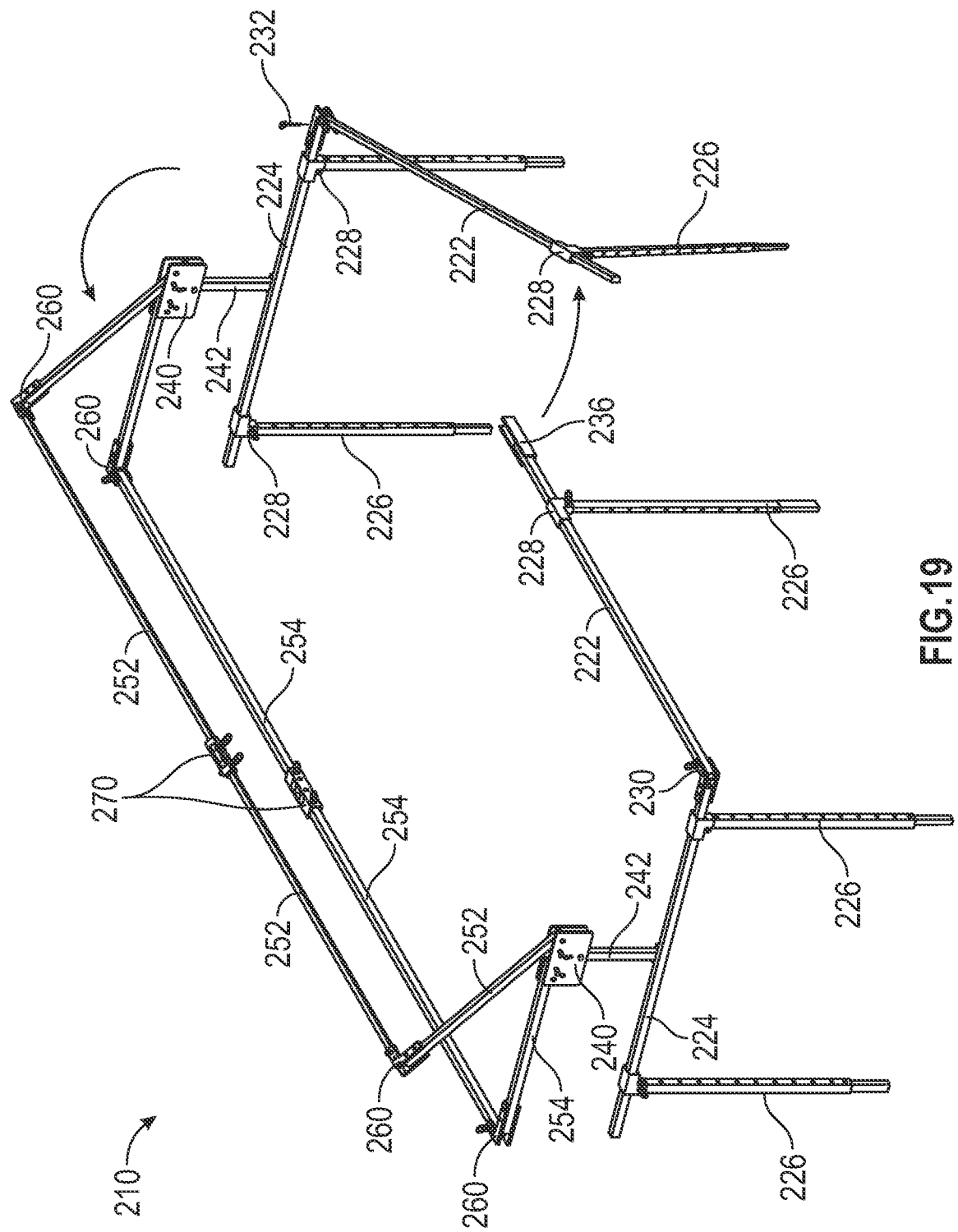
FIG. 19 illustrates how the alternative embodiment of FIG. 18 includes the ability to separate the front panel to provide a gate for departing from the portable hunting blind.

As specified above, the skeletal frame 210 too provides a blind top panel 250, similar to the blind top panel 60 explained above. The blind top panel 250 includes a front top panel 252 and a rear top panel 254 pivotally mounted to the center brackets 240. Each of the front top panel 252 and the rear top panel 254 is pivotally mounted to the center brackets 240 provided at far sides. The front top panel 252 and the rear top panel 254 are provided in a U-shape configuration. As such, the corners of the front top panel 252 and the rear top panel 254 are mounted using a corner support bracket 260. Further, latches 270 may be used for joining smaller rails used for forming the elongated portion of the U-shape structure of the front top panel 252 or the rear top panel 254. As specified above, the center brackets 240 acts as pivot points for the front top panel 252 or the rear top panel 254 to form one dual-action tops. As such, the front top panel 252 can be thrown back towards the rear top panel 254. FIG. 19 shows an aspect of the skeletal frame 210, which has an ability to fold back or throw back the front top panel 252 to separate the skeletal frame 210 at the front wall to provide a gate for departing from the portable hunting blind.

The skeletal frame 210 can be used with the setup shown of the portable hunting blind shown in FIG. 14 to implement a further embodiment of the portable hunting blind.

Figure 20:
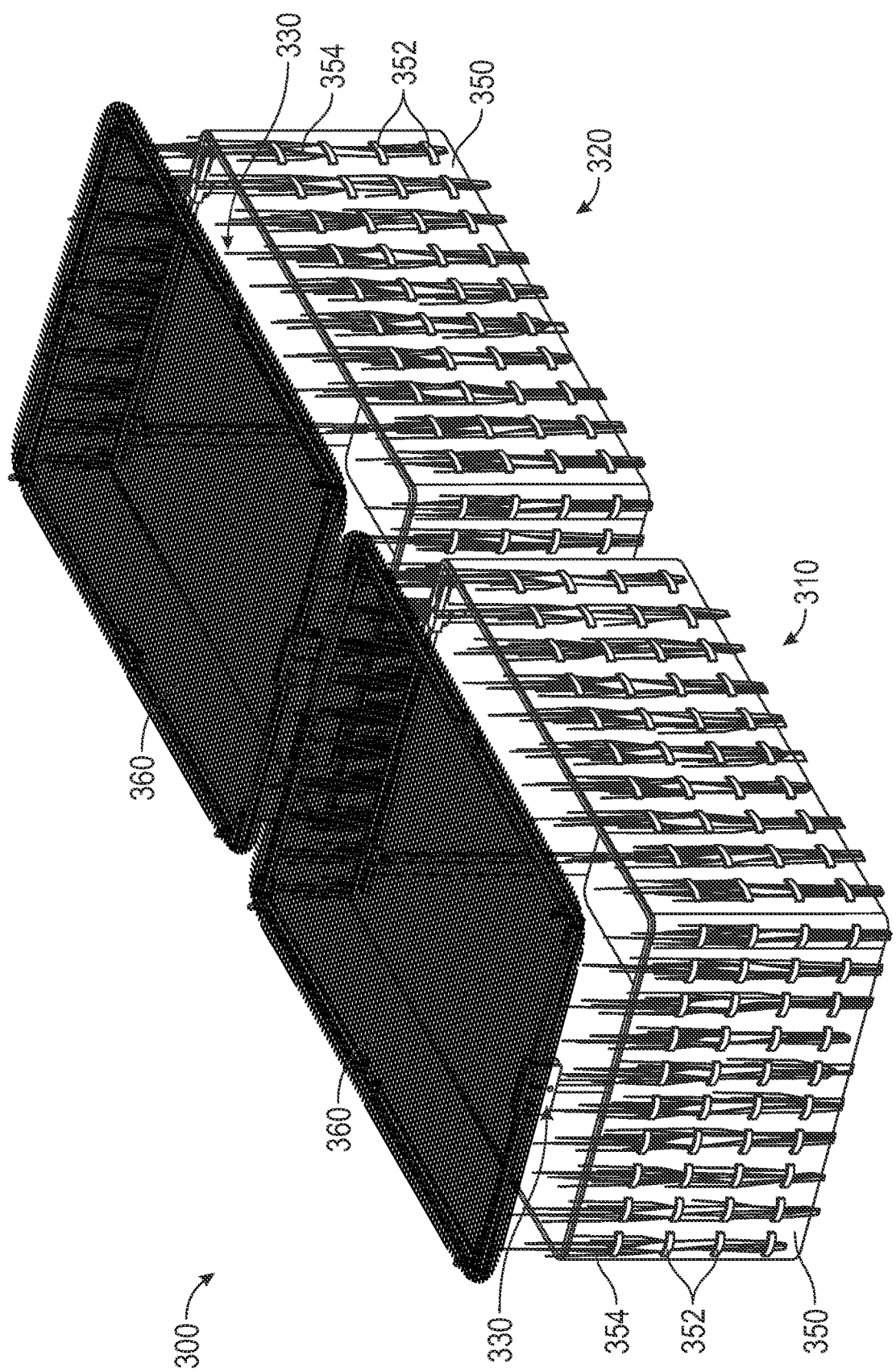
FIG. 20 illustrates an aspect of the larger portable hunting blind of the present disclosure including the ability to partition or form two modules from the larger portable hunting blind.
Figure 21:
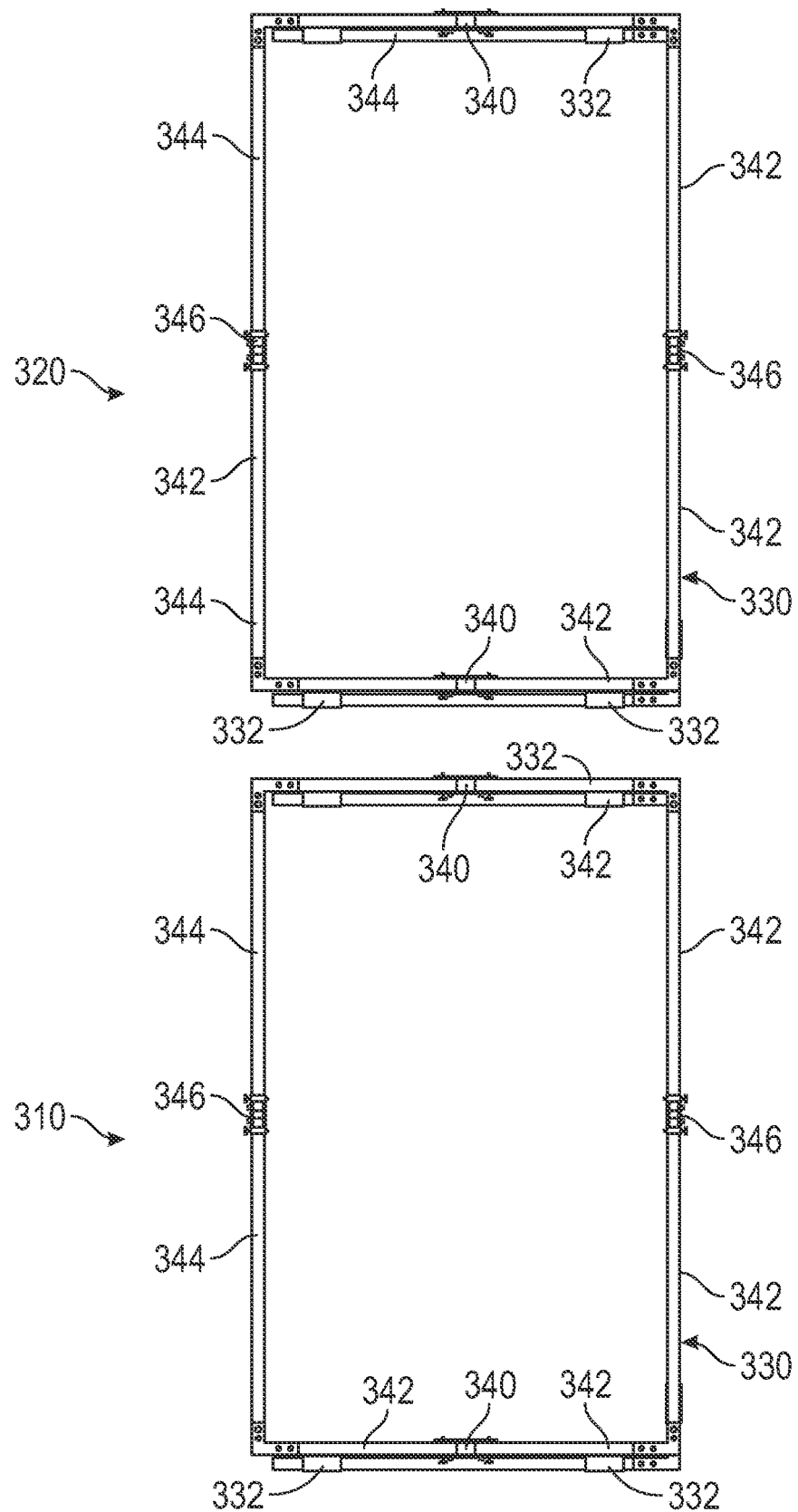
FIG. 21 depicts a top down orthogonal view of the modular configuration frame of FIG. 20 to illustrate how the larger portable hunting blind can form two separate modular smaller portable hunting blinds.

FIG. 20 shows a larger configuration of a 10.5' portable hunting blind 300 including an ability to partition or form two modules 310 and 320 from the larger portable hunting blind 300, in accordance with one embodiment of the present invention. In the current embodiment, the portable hunting blind 300 provides two modules 310 and 320, each having a small configuration of 5.25' such that portable hunting blind 300 that can accommodate four to six hunters can be converted to a comfortable two-man or three man blind. As such, the larger portable hunting blind 300 is converted into the two smaller portable hunting blinds 310 and 320. Each of the portable hunting blinds 310 and 320 includes a skeletal frame 330 (similar to skeletal frame 20 shown in FIG. 2), as shown in FIG. 21. Each skeletal frame 330 provides a front panel (not shown) and end panels 332. The end panels 332 are mounted to a blind top panel with the help of center bracket 340. The blind top panel includes a front top panel 342 and a rear top panel 344 mounted to the center brackets 340. Each of the front top panel 342 and the rear top panel 344 may be mounted using a latch 346.

Further, each of the smaller portable hunting blinds 310 and 320 is provided with a wind blocker 350 put around the respective skeletal frame 330. It should be understood that each smaller portable hunting blinds 310 and 320 provides front gate/panel and two side ends/panels and the wind blocker 350 acting as a wind blocker at the back/rear of the portable hunting blind 300. The wind blocker 350 is provided with brush straps 352 for tying brushes 354 to the wind blocker 350. Further each of the smaller portable hunting blinds 310 and 320 is provided with a blind top 360 mounted over the blind top panel. It should be understood that the each of the smaller portable hunting blinds 310 and 320 functions similar to the portable hunting blind explained above.

In the current embodiment, in order for a single portable hunting blind to quickly and easily separate into two smaller portable hunting blinds the disclosed portable hunting blind provides a center connector (not shown) to attach both blind top panels together in the center. Further, the portable hunting blind provides a telescoping tube (not shown) that is held on by spring buttons. The hunter simply depresses the buttons and can slide the center connector left or right. It remains on one of the two sides. Then, the end of the blind top panels may be connected for each of the two smaller portable hunting blinds to each end that were just disconnected from the large portable hunting blind.

Figure 22:
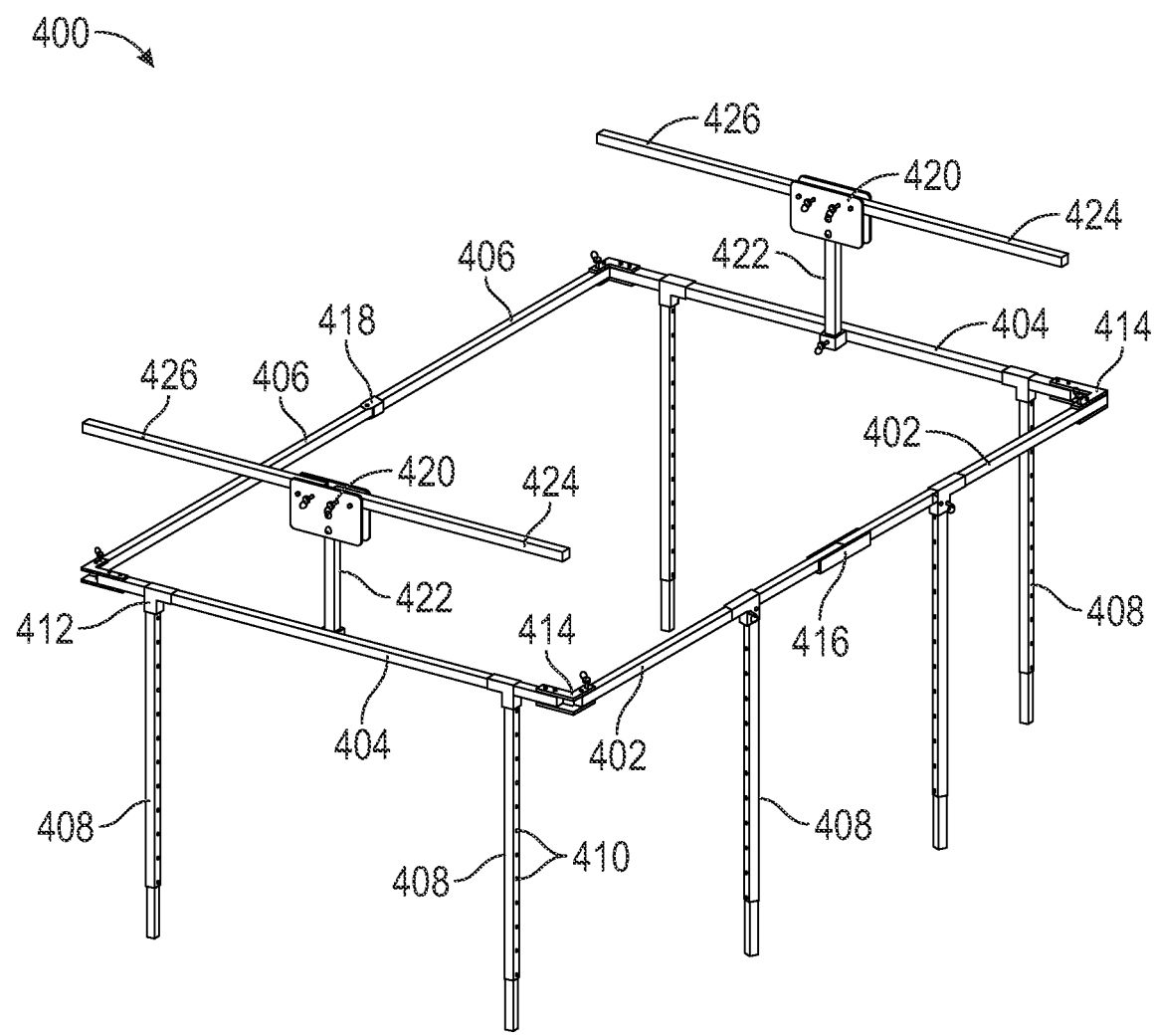
FIGS. 22 and 23 show perspective views of skeletal frames, in accordance with various embodiments of the present disclosure.

FIG. 22 shows a perspective view of a skeletal frame 400, in accordance with another embodiment of the present invention. Skeletal frame 400 provides front panels 402, each front panel 402 having a dimension of approximately 5.25' and thus making front panel 402 to have about 10.5' in length. Further, skeletal frame 400 includes end panels or side panels 404 mounted to front panel 402. Further, skeletal frame 400 provides two rear panels 406. As can be seen from FIG. 22, rear panels 406 have approximately same length to that of front panels 402. Each of front panels 402 and end panels 404 includes legs 408. Legs 408 include holes 410 and allows for adjusting height as explained above. Legs 408 mount to front panels 402 and end panels 404 with the help of sockets 412.

Front panels 402 and rear panels 406 connect to end panels 404 using connecting brackets or corner brackets 414. Similarly, end panels 404 and rear panels 406 are connected. Each of connecting brackets 414 includes a fastener or a pin for securing panels of the skeletal frame 400. Further, skeletal frame 400 provides a U-channel 416 for connecting front panels 402. In addition, rear panels 406 stay connected with the help of a connector 418. Optionally, rear panels 406 include U-channel similar to U-channel 416. Further, skeletal frame 400 includes center brackets 420 provided at end panels 404. Each of center brackets 420 mounts at respective end panel 404 via a connecting rod 422. As specified above, skeletal frame 400 provides front top panel 424 and rear top panel 426. The construction and working of the front top panel 424 and rear top panel 426 are similar to blind top panel 60 as explained above. In the current embodiment, the skirt mounts to the panels and the blind top mounts over the front top panel 424 and the rear top panel 426 for concealing hunter(s) inside the skeletal frame 400.

In comparison with earlier embodiments, front top panel 424 and rear top panel 426 are at their half-length. Here, front top panel 424 and rear top panel 426 operate similar to the front top panel and rear top panel explained above. One skilled in the art understands that front top panel 424 and rear top panel 426 work better with shorter portable hunting blinds. As the distance (front panel 402) is shorter, the tautness of the front top panel 424 or rear top panel 426 allows the hunter to throw the skirt back and the ends rotate backwards without the need of a front and rear cross beam. This presents an advantage to collapse front top panel 424 and rear top panel 426 with center brackets 420 straight down by adjusting the height of the connecting rod 422 and then fold with the front panels 402, end panels 404 and rear panels 406. By not removing front top panel 424 and rear top panel 426 with center brackets 420, hunter can fold portable hunting blind encompassing skeletal frame 400 in less than one minute and be on the move.

In addition, the present embodiment does not have legs at the rear. This allows use of a brace/tubing that spans the front of the portable hunting blind. This part has no supporting legs. As the end to end length is significantly less, the ends offer plenty of support for the brace, where the windblocker mounts. This brace has a pivot bracket in the middle and folds in half for transport. When the hunter wishes to exit the portable hunting blind, the hunter simply lifts the brace off a spindle and rotates the brace/span allowing the hunters to exit.

Figure 23:
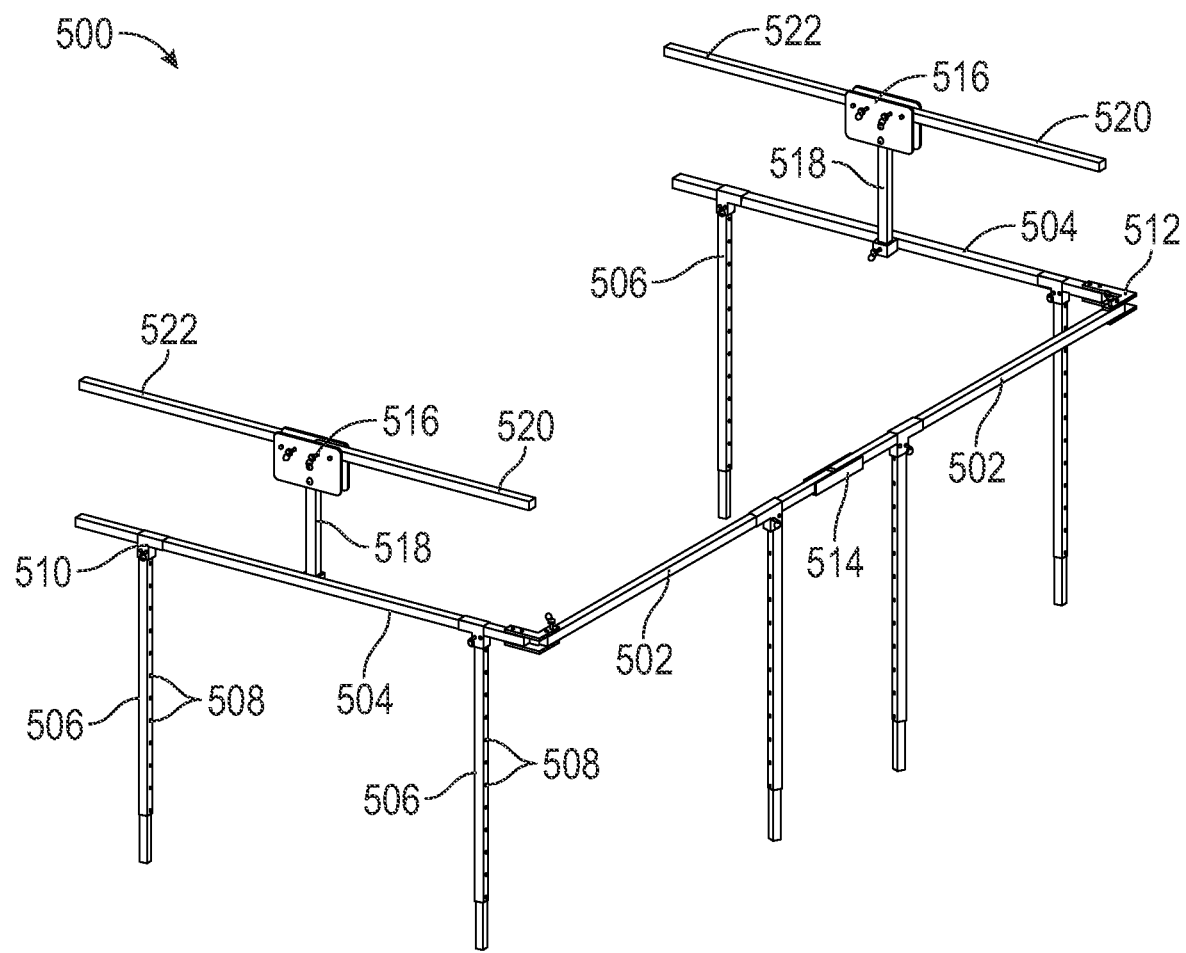

FIG. 23 shows a perspective view of a skeletal frame 500, in accordance with yet another embodiment of the present invention. Skeletal frame 500 provides front panels 502. Each front panel 502 has a dimension of approximately 5.25' and thus making front panel 502 to have about 10.5' in length. Further, skeletal frame 500 includes end panels or side panels 504 mounted to front panel 502. In the current embodiment, skeletal frame 500 does not include rear panels when compared to the embodiment explained with respect to FIG. 22. In the current embodiment, each of front panels 402 and end panels 404 includes legs 506. Legs 506 include holes 508 and allows for adjusting height as explained above. Legs 506 mount to front panels 502 and end panels 504 with the help of sockets 510. Front panels 502 connect to end panels 504 using connecting brackets or corner brackets 512. Each of connecting brackets 512 includes a fastener or a pin for securing panels of the skeletal frame 500. Skeletal frame 500 presents a U-channel 514 for connecting front panels 502. Further, skeletal frame 500 includes center brackets 516 provided at end panels 504. Each of center brackets 516 mounts at respective end panel 504 via a connecting rod 518. As specified above, skeletal frame 500 provides front top panel 520 and rear top panel 522. The construction and working of the front top panel 520 and rear top panel 522 are similar to blind top panel 60 as explained above. In the current embodiment, the skirt mounts to panels and blind top mounts over front top panel 520 and rear top panel 522 for concealing hunter(s) inside skeletal frame 500.

Figure 24:
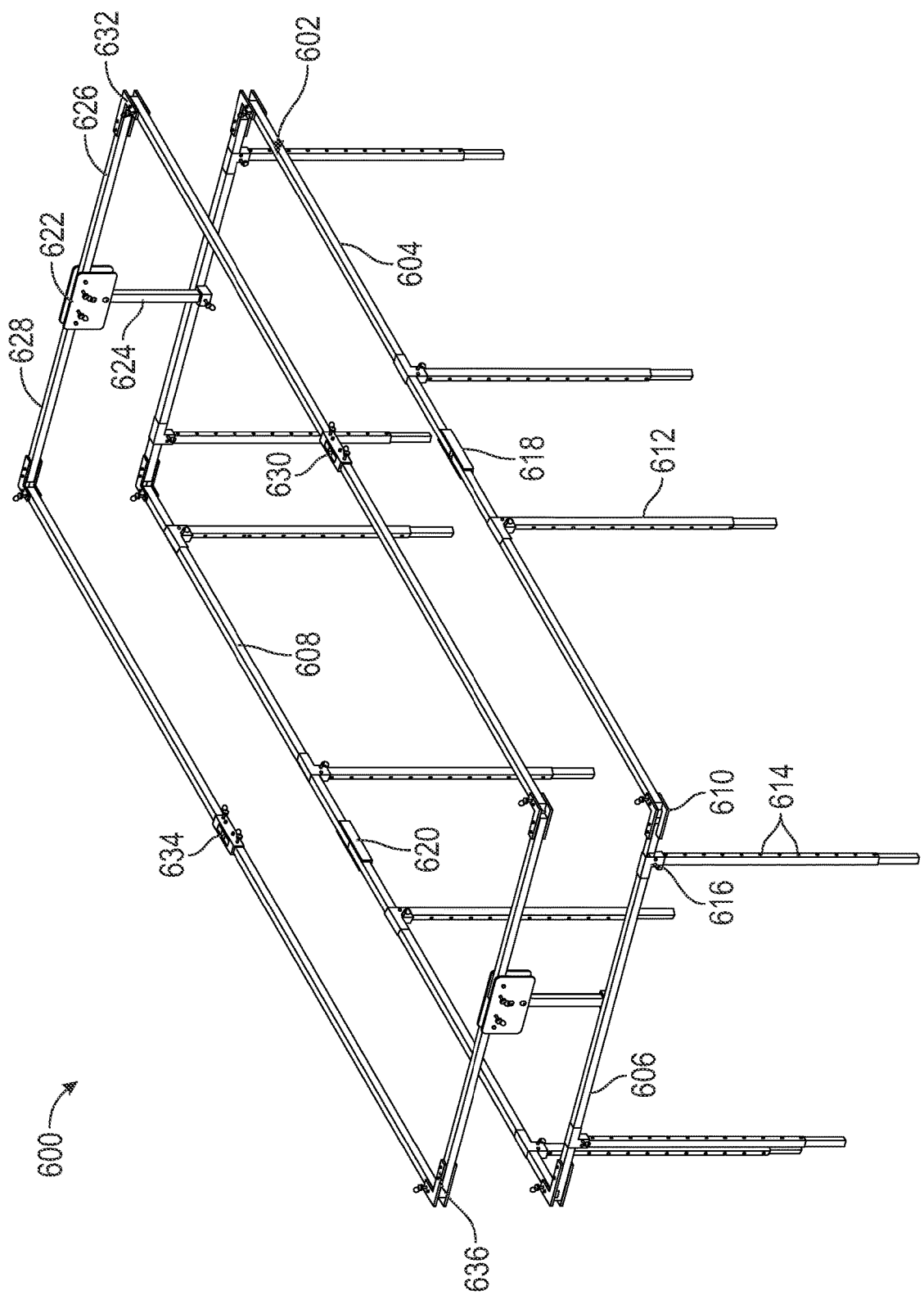
FIGS. 24 and 25 show a skeletal frame and a portable hunting blind that encompasses the skeletal frame (FIG. 24), in accordance with another embodiment of the present disclosure.
Figure 25:
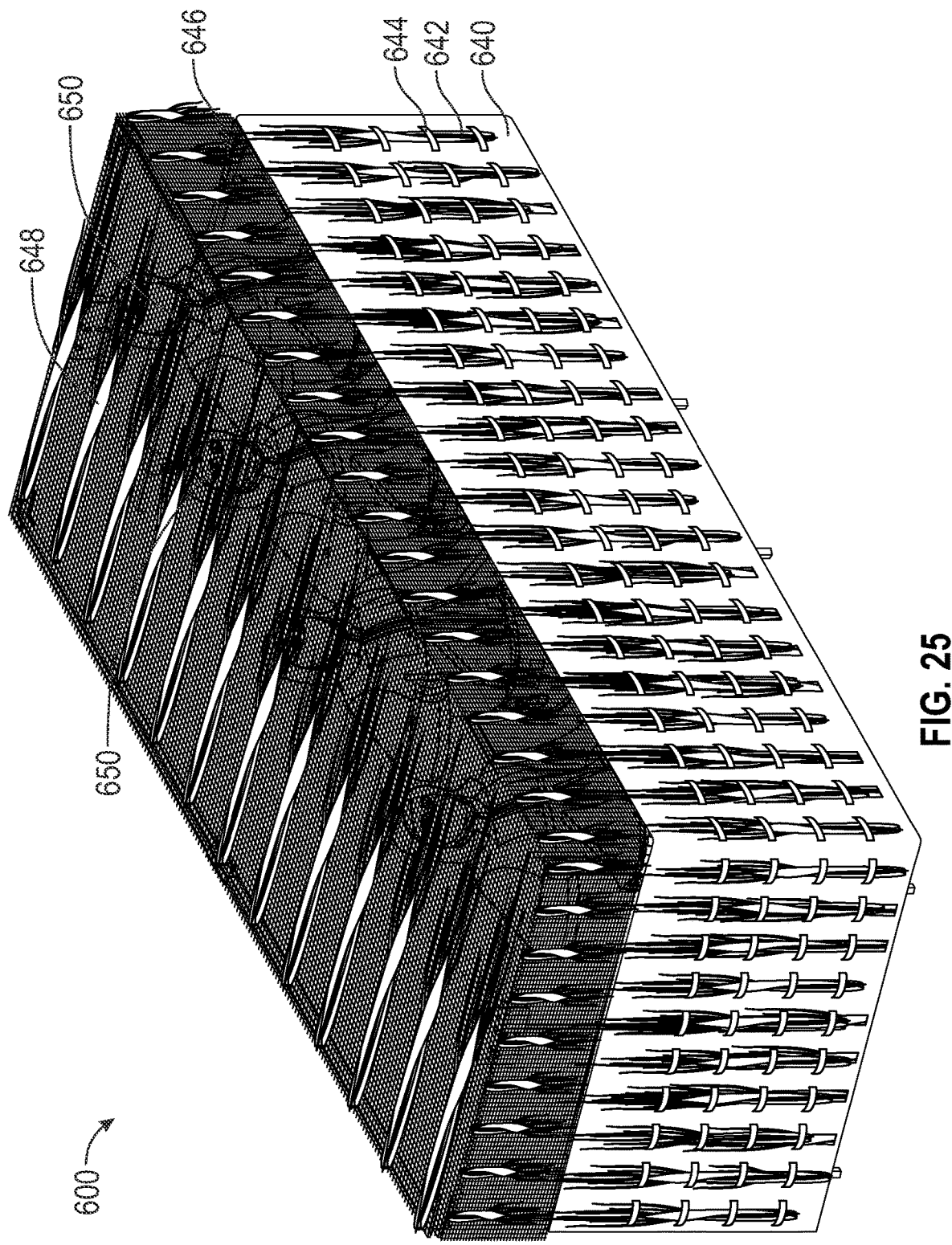

Referring to FIGS. 24 and 25, a portable hunting blind 600 (FIG. 25) encompassing a skeletal frame 602 are shown, in accordance with one embodiment of the present invention. One skilled in the art understands that each of the embodiments explained above operate similar to FIGS. 24 and 25 with changes to constructional features of respective skeletal frame. It is obvious to a person skilled in the art to modify any other skeletal frames and attach a windblocker or blind top to conceal a hunter without departing from the scope of the present invention. Any such modifications fall within the scope of the present invention.

Portable hunting blind 600 encompasses skeletal frame 602. Skeletal frame 602 provides front panels 604. Each front panel 604 has a length varying from 3' to 5.25'. Further, skeletal frame 602 includes end panels or side panels 606 that mount to front panel 604. Skeletal frame 602 provides two rear panels 608. Front panels 604 and rear panels 608 connect to end panels 606 using first corner brackets 610. Each of front panels 604, end panels 606 and rear panels 608 includes legs 412. Legs 412 include holes 414 that allow for adjusting height of legs 412 as explained above. Legs 412 mount to front panels 604, end panels 606 and rear panels 608 with the help of sockets 616.

Further, skeletal frame 602 provides a first U-channel 618 for connecting front panels 604. Similarly, skeletal frame 602 provides a second U-channel 620 for connecting rear panels 608. Further, skeletal frame 602 includes center brackets 622 provided at end panels 606. Each of center brackets 622 mounts at respective end panel 606 via a connecting rod 624. As specified above, skeletal frame 602 provides front top panel 626 and rear top panel 628. Front top panel 626 connects via a connector 630 and a second corner bracket 632. Rear top panel 628 connects via a connector 634 and a third corner bracket 636. Connectors 630; 634 help to quickly fold front top panel 626 and rear top panel 628 in half for transport. In the current embodiment, each of first U-channel 618 and second U-channel 620 allow hunters to exit portable hunting blind 600 upon lifting front top panel 626 and rear top panel 628, respectively, as explained above.

FIG. 25 shows a perspective view of portable hunting blind 600 in which skirt 640 envelopes skeletal frame 602. Wind blocker 640 includes brush straps 642 located around the outer edge of wind blocker 640 for holding brushes 644. Further, portable hunting blind 600 provides a blind top 646, similar to blind top 90 explained above. In the current embodiment, blind top 646 covers entirely in that there is no gap at the sides. This is different from the embodiment illustrated in FIG. 1 where blind top 90 presents a gap allowing hunters to see through. In one example, blind top 646 encompasses openings 648 at the top allowing hunters 650 concealed inside to look outside. This allows hunters 650 to conceal themselves from flying or land-based game 654 during a hunt. The present embodiment illustrates a 10.5' configuration of portable hunting blind 600. Portable hunting blind 600 allows for use by at least three or four hunters 650.

Figure 26:
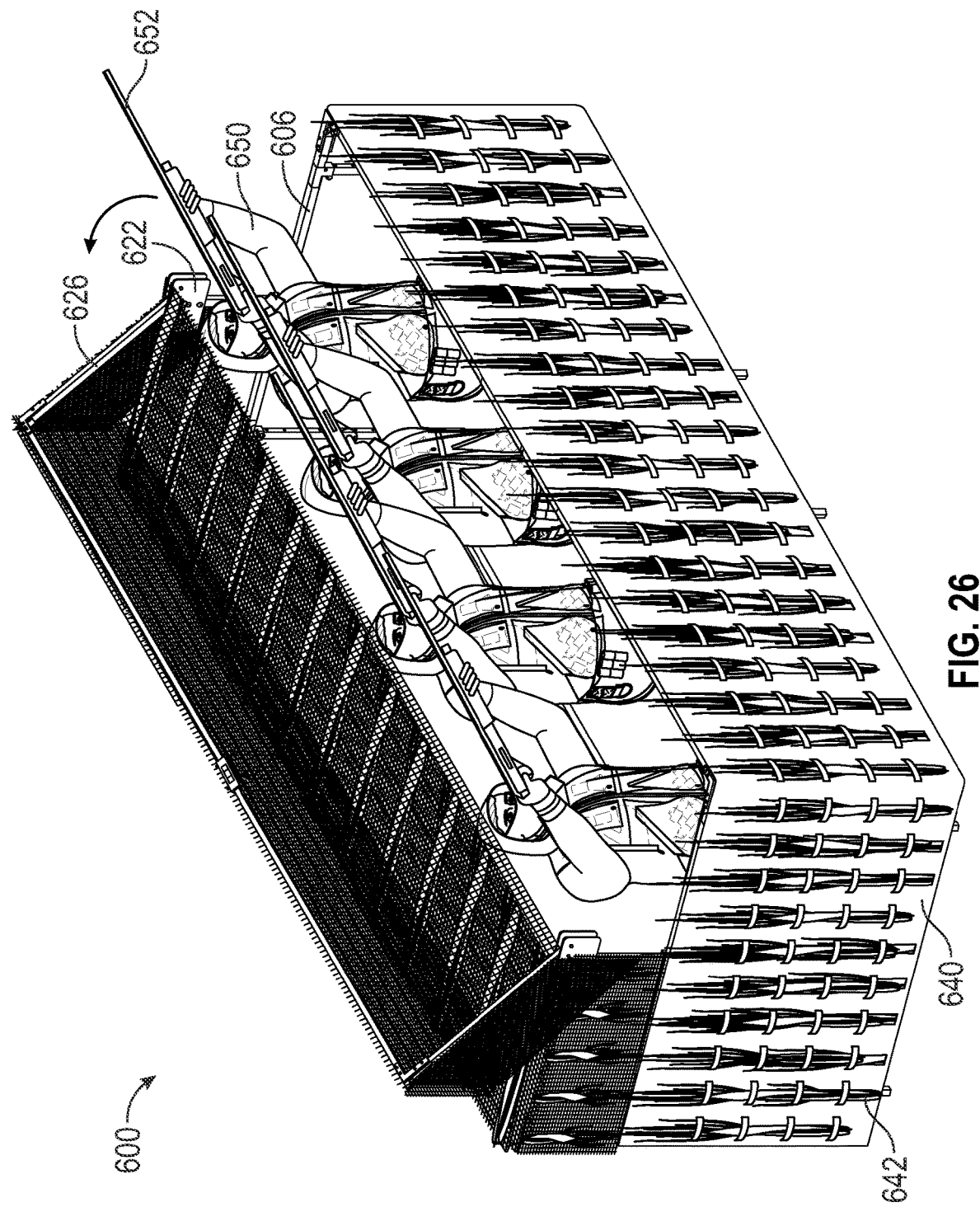
FIGS. 26 and 27 show a feature of hunter shooting down game upon lifting top panel and exiting the portable hunting blind to pick up the fallen game.
Figure 27:
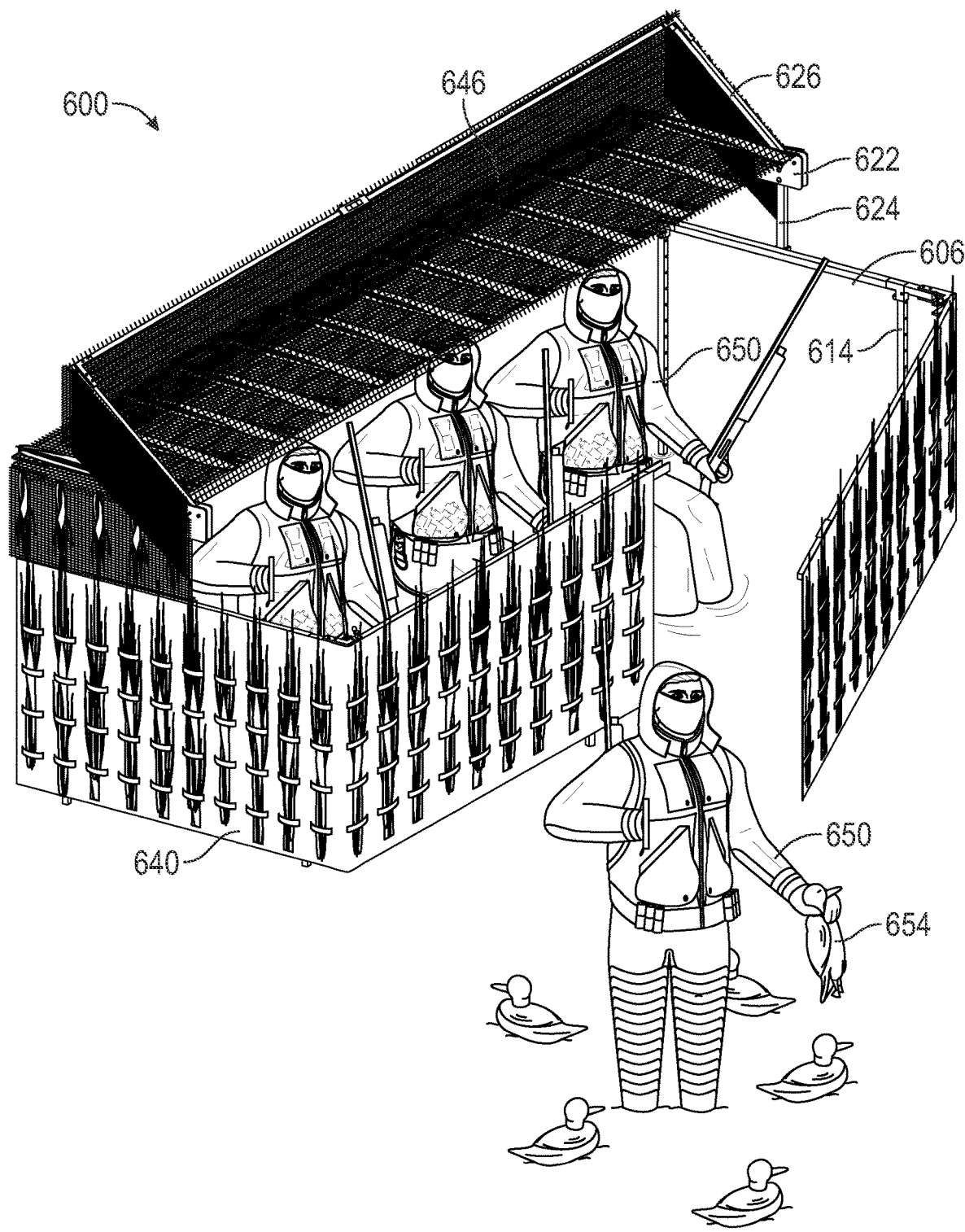

When hunters 650 spot flying or land-based game 654, one or more hunters 650 throwback front top panel 626 and stand to shoot the flying or land-based game 654 using a firearm 652, as shown in FIG. 26. As can be seen from FIG. 26, portable hunting blind 600 provides plenty of room for hunters 650 to stand and shoot flying or land-based game 654. Subsequently, 1 hunter 650 lifts front panel 604 from first U-channel 618 and exits portable hunting blind 600 to pick up the fallen game 654, as shown in FIG. 27.

Figure 28:
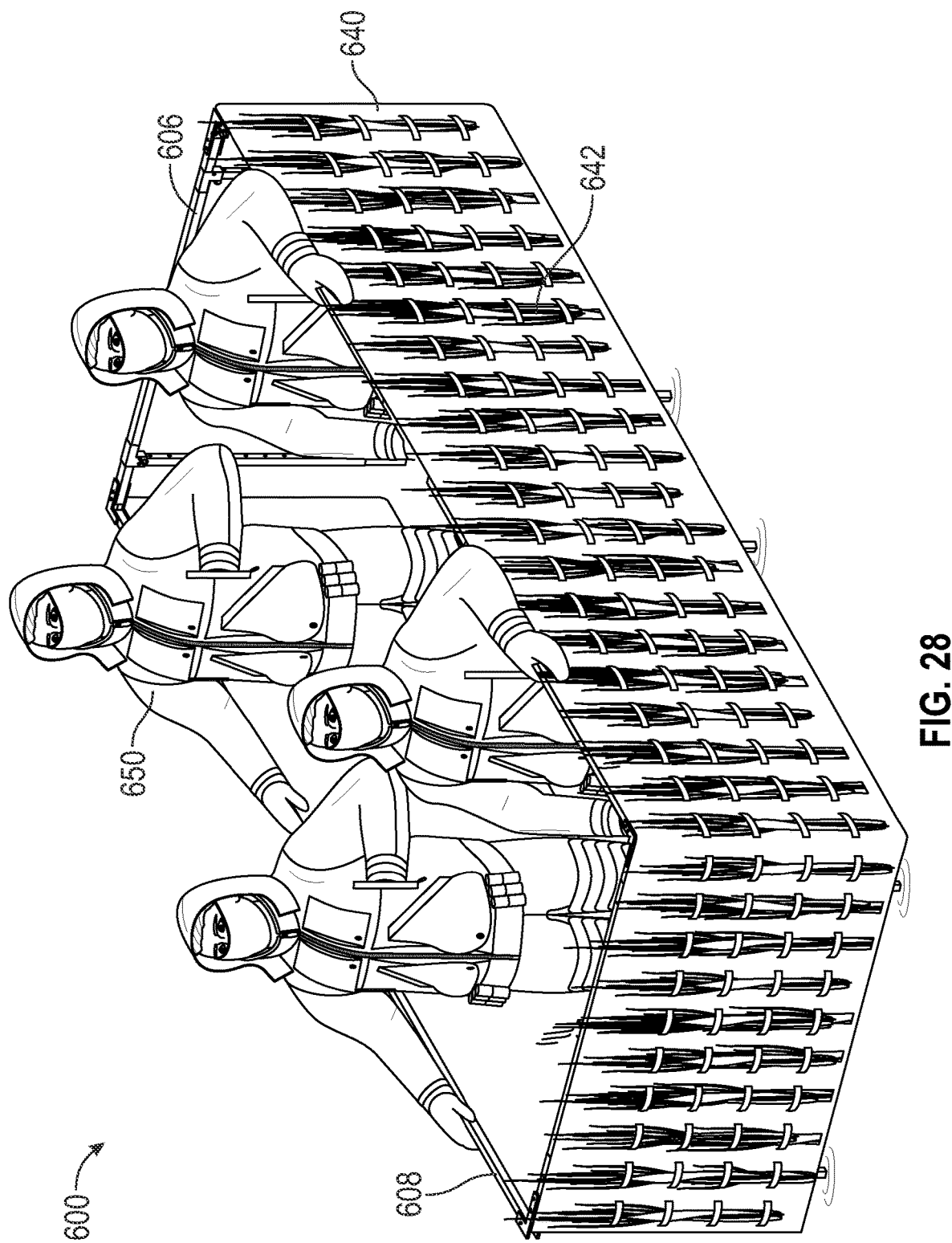
FIG. 28 shows a feature of uninstalling portable hunting blind.
Figure 29:
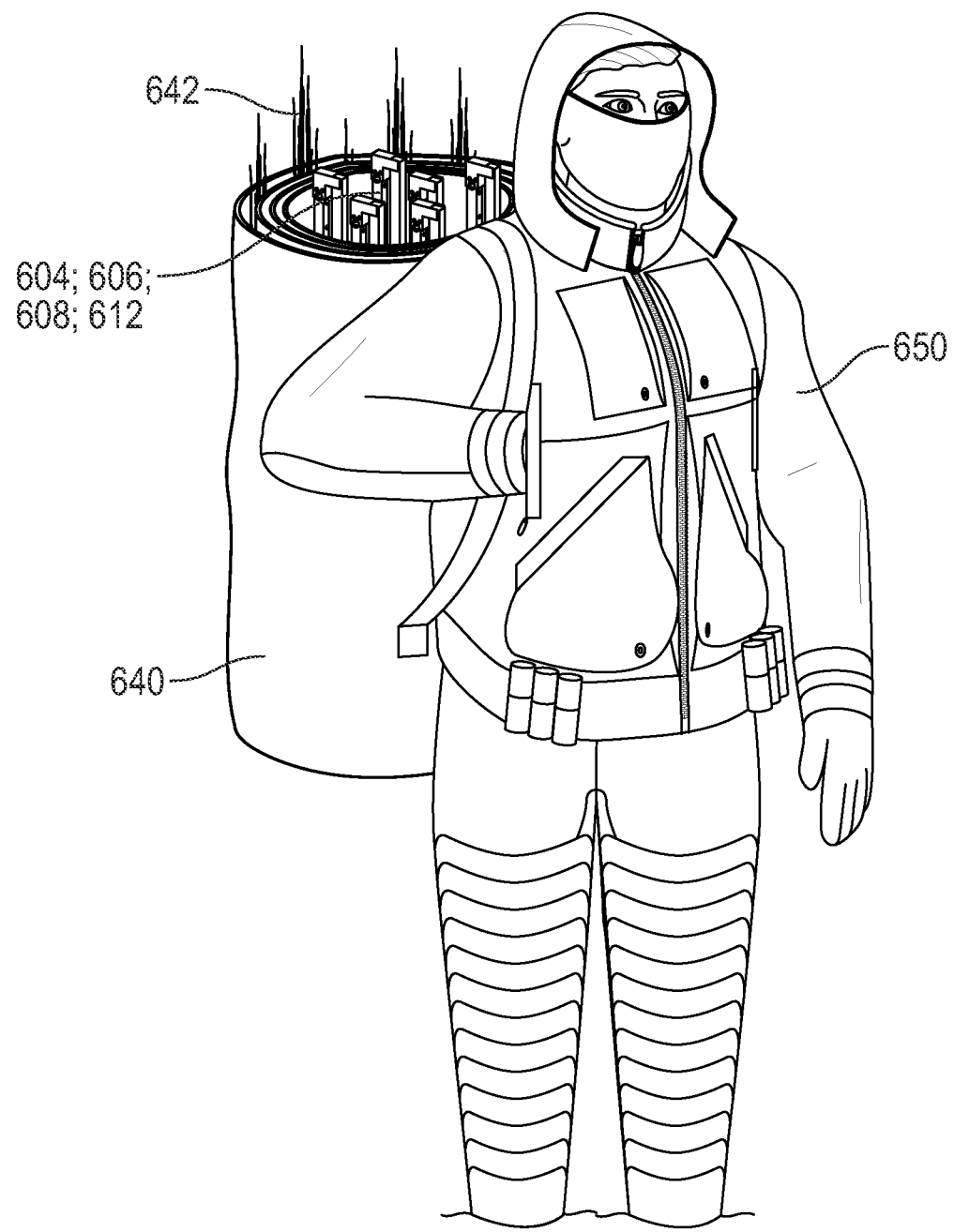
FIG. 29 shows a hunter carrying the folded portable hunting blind over his shoulder.

After hunting, hunters 650 pull down center brackets 622 which collapse over end panels 606 and fold with front panels 604, end panels 606, and rear panels 608. This allows hunters 650 to retain all parts intact and fold easily in a short period of time, say one minute. Further, hunters 650 can easily install when they have to hunt. Alternatively, hunters 650 uninstall center brackets 622, front top panel 626 and rear top panel 628 as shown in FIG. 28. In accordance with one embodiment of the present invention, portable hunting blind 600 allows for folding such that a single hunter 650 is able to carry it. In order to fold portable hunting blind 600, hunters 650 fold front top panel 626 and rear top panel 628 in half. Here, a person skilled in the art understands that portable hunting blind 600 folds in half in the center cutting portable hunting blind 600 length in half and then both end panels 606-fold inward allowing the two front and rear panels to fold flat against one another like an accordion. Further, hunters 650 lower center brackets 622 by adjusting connecting rod 624 and fold front panels 604, end panels 606, rear panels 608 and legs 612 while retaining wind blocker 640. Alternatively, a hunter 650 spreads a cover (not shown), which he lays flat on the ground. Subsequently, hunter 650 lays wind blocker 640 onto the cover, and removes and folds front top panel 626 and rear top panel 628 and lays them on the cover. Further, hunter 650 takes front panels 604, end panels 606, and rear panels 608, folds legs 612 up and lays them flat on the cover. Subsequently, hunter 650 rolls cover around wind blocker 640, top and to ends of portable hunting blind 600 and secures the cover and carries over his shoulder, as shown in FIG. 29.

Based on the above, it is evident that the present invention provides a 6.5', an 8.5' and a 10.5' configuration of a portable hunting blind. The portable hunting blind includes the blind top panel the feature of being able to be thrown up and behind the hunters. Because of this feature, hunters never lose visual track of the birds. When the blind top panel is thrown back, the blind top panel now impedes rear exiting of the portable hunting blind. In addition, when the blind top panel is thrown back on itself, the presently disclosed portable hunting blind provides a front wall door/gate/panel that make hunting blind exiting simple and easy.

In essence, the present invention provides a portable hunting blind including a blind top panel providing end-to-end and front-to-back concealment, that after being engaged and thrown to the front or rear, allows easy exiting out from the front or back.

The blind top panel pivots from each end to allow only one person to engage the blind top panel for all hunters in the portable hunting blind, instead of multiple blind top panels per hunter. The blind top panel of the present portable hunting blind opens to the rear and front and remains inside the perimeter of the portable hunting blind, without falling outside the portable hunting blind. Designing the blind top panel so it throws behind the hunter allows the blind top panel to open without ever impeding the hunter's view of the birds while shooting.

In the above description, numerous specific details are set forth such as examples of some embodiments, specific components, devices, methods, in order to provide a thorough understanding of embodiments of the present disclosure. It will be apparent to a person of ordinary skill in the art that these specific details need not be employed and should not be construed to limit the scope of the disclosure.

In the development of any actual implementation, numerous implementation-specific decisions must be made to achieve the developer's specific goals, such as compliance with system-related and business-related constraints. Such a development effort may be complex and time consuming, but is nevertheless a routine undertaking of design, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded the widest scope consistent with the principles and novel features disclosed herein. It is contemplated that additional embodiments are within the spirit and true scope of the disclosed subject matter.

What is claimed is:
1. A portable hunting blind, comprising:
a blind side panel, comprising:
a front panel;
end panels removably mounted to the front panel; and
legs provided at the front panel and the end panels;
a blind top panel comprising a front top panel and a rear top panel, the front top panel and the rear top panel pivotally mounted to a center bracket, the center bracket being mounted to the end panels;

a blind secured around the blind side panel to envelope the blind side panel for camouflaging a hunter; and a blind top mounted over the blind top panel for concealing the hunter from above, wherein the front top panel comprising the blind top is thrown back over the rear top panel to impede rear exit for the hunter, and to allow the hunter to demount the front panel and open the front panel along with the blind outward as a gate to exit the portable hunting blind.

2. The portable hunting blind of claim 1, wherein the rear top panel comprising the blind top is thrown back over the front top panel to impede front exit for the hunter, and to allow the hunter to demount the blind to allow the hunter to exit the portable hunting blind from rear of the portable hunting blind.

3. The portable hunting blind of claim 1, wherein the front panel is provided in two halves connected using a U-channel.

4. The portable hunting blind of claim 3, wherein the front top panel comprising the blind top is thrown back over the rear top panel to impede rear exit for the hunter, and to allow the hunter to demount a half panel of the two halves from the U-channel to exit the portable hunting blind.

5. The portable hunting blind of claim 1, wherein each of the legs comprise a leg height adjusting mechanism for adjusting the height of legs.

6. The portable hunting blind of claim 1, wherein the center bracket is mounted to the end panels using a connecting rod.

7. The portable hunting blind of claim 6, wherein the connecting rod comprises a height adjusting mechanism for adjusting a gap between the blind side panel and the blind top panel.

8. The portable hunting blind of claim 1, wherein the blind top includes a see-through mesh for allowing the hunter to see outside while concealing the hunter from outside.

9. The portable hunting blind of claim 1, wherein the blind comprises brush straps for holding brushes for blending the portable hunting blind with environment.

10. A portable hunting blind, comprising:
a blind side panel, comprising:
a front panel;
a rear panel;
end panels removably mounted to the front panel and the rear panel; and
legs provided at the front panel and the end panels;
a blind top panel comprising a front top panel and a rear top panel, the front top panel and the rear top panel pivotally mounted to a center bracket, the center bracket being mounted to the end panels;
a blind secured around the blind side panel to envelope the blind side panel for camouflaging a hunter; and
a blind top mounted over the blind top panel for concealing the hunter from above,
wherein the front top panel comprising the blind top is thrown back over the rear top panel to impede rear exit for the hunter, and to allow the hunter to demount the front panel and open the front panel along with the blind outward as a gate to exit the portable hunting blind from front, or
the rear top panel comprising the blind top is thrown back over the front top panel to impede front exit for the hunter, and to allow the hunter to exit the portable hunting blind from rear.

11. The portable hunting blind of claim 10, wherein the rear panel is provided with a gap to allow the hunter to demount the blind and to exit the portable hunting blind through the gap from rear of the portable hunting blind.

12. The portable hunting blind of claim 10, wherein the front panel is provided in two halves and further connected using a U-channel.

13. The portable hunting blind of claim 12, wherein the front top panel comprising the blind top is thrown back over the rear top panel to impede rear exit for the hunter, and to allow the hunter to demount a half panel of the two halves from the U-channel to exit the portable hunting blind.

14. The portable hunting blind of claim 10, wherein the center bracket is mounted to the end panels using a connecting rod.

15. The portable hunting blind of claim 14, wherein the connecting rod comprises a height adjusting mechanism for adjusting a gap between the blind side panel and the blind top panel.

16. The portable hunting blind of claim 10, wherein the blind top includes a see-through mesh for allowing the hunter to see outside while concealing the hunter from outside.

17. The portable hunting blind of claim 10, wherein the blind comprises brush straps for holding brushes for blending the portable hunting blind with environment.

18. The portable hunting blind of claim 10, wherein the blind comprises brush straps for holding brushes for blending the portable hunting blind with environment, and wherein the blind top includes a see-through mesh for allowing the hunter to see outside while concealing the hunter from outside.

19. A portable hunting blind, comprising:
two modules, each comprising:
a blind side panel, comprising:
a front panel;
end panels removably mounted to the front panel; and
legs provided at the front panel and the end panels;
a blind top panel comprising a front top panel and a rear top panel, the front top panel and the rear top panel pivotally mounted to a center bracket, the center bracket being mounted to the end panels;
a blind secured around the blind side panel to envelope the blind side panel for camouflaging a hunter; and
a blind top mounted over the blind top panel for concealing the hunter from above; and
a center connector for connecting the blind top panels of the two modules to use as a larger portable hunting blind, and the center connector is slid into a blind top panel of one of the two modules to separate the modules and to use them as a smaller portable hunting blind,
wherein the front top panel comprising the blind top in each of the modules is thrown back over the rear top panel to impede rear exit for the hunter, and to allow the hunter to demount the front panel and open the front panel outward as a gate to exit the portable hunting blind.

20. The portable hunting blind of claim 19, wherein the rear top panel comprising the blind top in each of the modules is thrown back over the front top panel to impede front exit for the hunter, and to allow the hunter to demount the blind to allow the hunter to exit the portable hunting blind from rear of the portable hunting blind.

\* \* \* \* \*